(12) United States Patent
Topchy

(10) Patent No.: US 12,126,863 B2
(45) Date of Patent: Oct. 22, 2024

(54) METHODS AND APPARATUS FOR MEASURING ENGAGEMENT DURING MEDIA EXPOSURE

(71) Applicant: The Nielsen Company (US), LLC, New York, NY (US)

(72) Inventor: Alexander Topchy, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/962,335

(22) Filed: Oct. 7, 2022

(65) Prior Publication Data
US 2023/0217071 A1    Jul. 6, 2023

Related U.S. Application Data

(60) Provisional application No. 63/295,773, filed on Dec. 31, 2021.

(51) Int. Cl.
*H04N 21/442* (2011.01)
*H04N 21/466* (2011.01)

(52) U.S. Cl.
CPC ... *H04N 21/44218* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 5,481,294 A | 1/1996 | Thomas et al. | |
| 9,332,363 B2 | 5/2016 | Jain | |
| 10,783,434 B1 | 9/2020 | Mitchell et al. | |
| 2009/0307084 A1 | 12/2009 | Monighetti et al. | |
| 2013/0019258 A1* | 1/2013 | Bhatia | H04N 21/25891 725/13 |
| 2013/0202128 A1 | 8/2013 | Jain et al. | |
| 2014/0337873 A1* | 11/2014 | Krug | H04H 60/33 725/18 |
| 2015/0106830 A1* | 4/2015 | Ramaswamy | H04H 60/58 725/18 |
| 2015/0128159 A1* | 5/2015 | Weinblatt | H04N 21/44218 725/12 |

(Continued)

OTHER PUBLICATIONS

International Preliminary Report on Patentability received in PCT Application No. PCT/US2022/011652, dated Jul. 4, 2023, 6 pages.

(Continued)

*Primary Examiner* — Alexander Q Huerta

(57) ABSTRACT

Methods, apparatus, systems, and articles of manufacture are disclosed for measuring engagement during media exposure. An example apparatus includes at least one memory, machine readable instructions, and processor circuitry to at least one of instantiate or execute the machine readable instructions to identify media presented via a media device in a media presentation environment, identify ambient audio detected in the media presentation environment, determine whether the ambient audio is distractive to presentation of the media in the media presentation environment, and adjust a media exposure report based on a determination that the ambient audio is distractive.

20 Claims, 10 Drawing Sheets

(56) References Cited

U.S. PATENT DOCUMENTS

| | | | |
|---|---|---|---|
| 2016/0154625 A1* | 6/2016 | Stout | H04N 21/4325 |
| | | | 715/716 |
| 2018/0077286 A1 | 3/2018 | Raanani et al. | |
| 2019/0019521 A1 | 1/2019 | Lynch et al. | |
| 2019/0188756 A1* | 6/2019 | Bradley | G06V 40/16 |
| 2019/0355350 A1* | 11/2019 | Jeyachandran | H03G 3/3005 |
| 2021/0224316 A1* | 7/2021 | Waye | H04N 21/8113 |
| 2022/0223171 A1* | 7/2022 | Berrada | G10L 15/08 |
| 2022/0270453 A1* | 8/2022 | Werner | G08B 13/04 |

OTHER PUBLICATIONS

International Search Report and Written Opinion, issued in connection with International Patent Application No. PCT/US2022/011652, mailed on May 6, 2022, 8 pages.

United States Patent and Trademark Office, "Non-Final Office Action," issued in connection with U.S. Appl. No. 17/571,261, mailed on Feb. 14, 2024, 8 pages.

United States Patent and Trademark Office, "Non-Final Office Action," issued in connection with U.S. Appl. No. 18/349,796, mailed on Feb. 15, 2024, 8 pages.

* cited by examiner

METHODS AND APPARATUS FOR MEASURING ENGAGEMENT DURING MEDIA EXPOSURE

RELATED APPLICATION

This patent claims the benefit of U.S. Provisional Patent Application No. 63/295,773, which was filed on Dec. 31, 2021. U.S. Provisional Patent Application No. 63/295,773 is incorporated herein by reference in its entirety. Priority to U.S. Provisional Patent Application No. 63/295,773 is claimed.

FIELD OF THE DISCLOSURE

This disclosure relates generally to measuring media exposure and, more particularly, to methods and apparatus for measuring engagement during media exposure.

BACKGROUND

Audience measurement entities (AMEs) monitor user interaction with media devices, such as smartphones, tablets, laptops, smart televisions, etc. To facilitate such monitoring, AMEs enlist panelists and install meters at the media presentation locations of those panelists. The meters monitor media presentations and transmit media monitoring information to a central facility of the AME. Such media monitoring information enables the AMEs to, among other things, monitor exposure to advertisements, determine advertisement effectiveness, determine user behavior, identify purchasing behavior associated with various demographics, etc.

BRIEF DESCRIPTION OF THE DRAWINGS

In general, the same reference numbers will be used throughout the drawing(s) and accompanying written description to refer to the same or like parts. The figures are not to scale.

Figure 1:
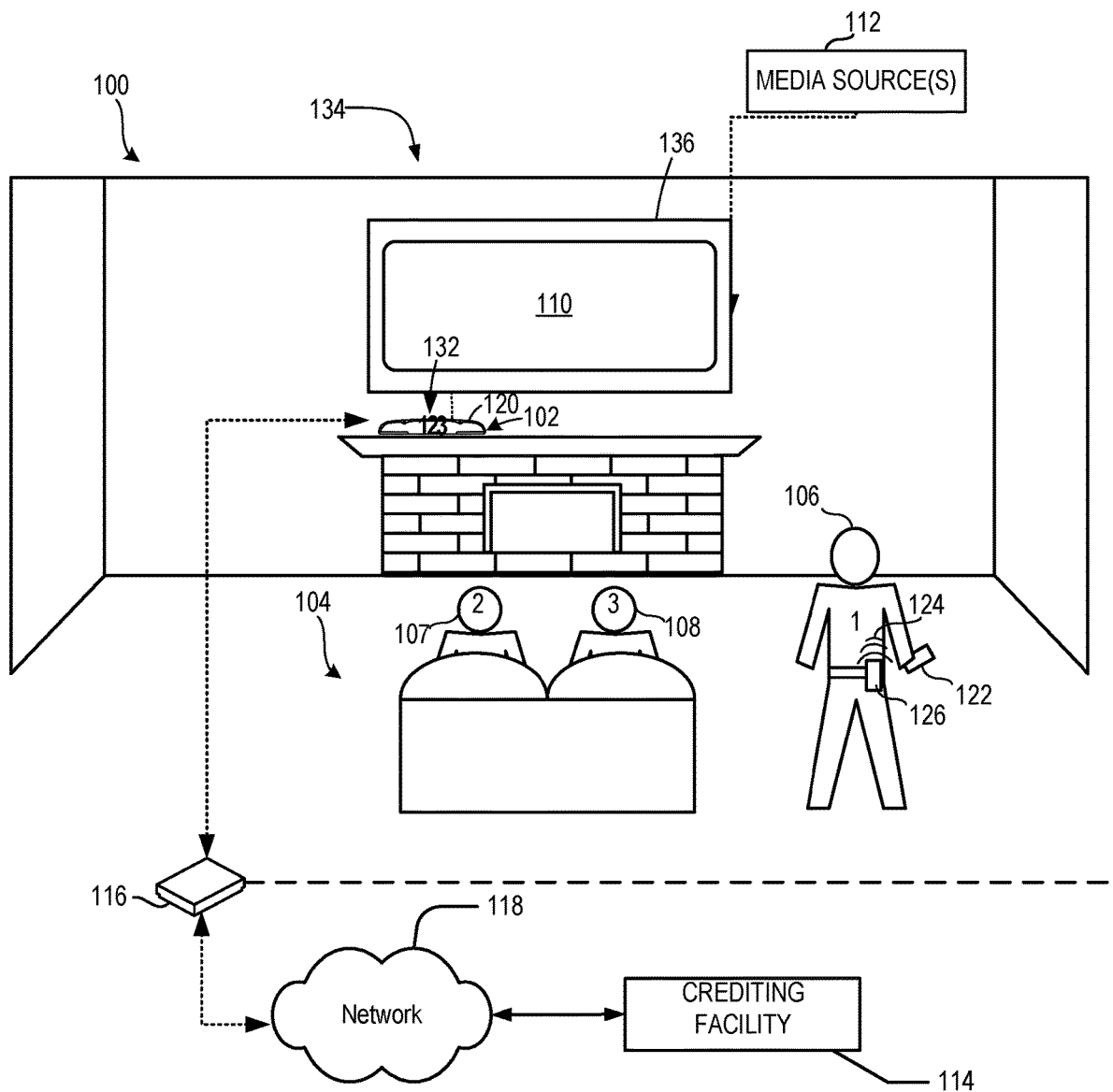
FIG. 1 illustrates an example environment in which an audience measurement system including an example meter and an example crediting facility to measure engagement during media exposure in accordance with the teachings of this disclosure.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities (AMEs) (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. For example, AMEs desire knowledge on how users interact with media devices, such as smartphones, tablets, laptops, smart televisions, etc. In particular, AMEs monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, web sites, streaming media, etc.

In addition to determining demographic reach for advertising and media programming based on registered panel members, audience measurement entities attempt to determine a viewer's focus and/or attention to media exposure. To determine a viewer's attention to a media exposure, some example audience measurement entities employ one or more facial recognition devices (e.g., camera's, etc.) that determine if an audience member or panelist's eyes are focused in a direction towards a media presentation device that presents the media exposure. However, such systems can be costly and require privacy waivers from panelists.

Example metering devices disclosed herein detect or measure panelist focus and/or attention to media exposure(s). The example metering devices can be used with or without cameras and/or other facial recognition techniques for measuring user focus. To detect or determine a panelist's attention to media exposure, example metering devices and related methods disclosed herein employ audio signatures of household noises. For example, by detecting or determining household noises (e.g., representative of audio signatures) that occur during media presentation, example audience measurement entities can determine if a panelist is paying attention or is distracted during a media presentation (e.g., based on an attention/distraction scale). For example, metering devices disclosed herein can detect audio signatures or noises during media presentation that can be evaluated or analyzed to determine a panelist's attention or distraction level during the media exposure.

As described herein, household noises include, but not limited, to, opening and/or closing of a refrigerator door, beeping of an electronic appliance (e.g., refrigerator, a microwave, a stove, etc.), a door bell, a telephone ringtone, an electric kettle, a fan, an air conditioner, a dishwasher, water flowing, toilet flushing, typing or texting, television tuning on and/or off, and/or any other noise, appliance or human activity associated with a household. Such household noises and/or panelist activities are also collectively referred to herein as "household audio clips," "ambient audio clips," etc. For example, there is no limit to the number or type of audio clips associated with a household. In some examples, household noises include signals (e.g., audio signals, etc.) in a media presentation environment or household that are signals not related to media signals (e.g., non-media signals).

Example metering devices disclosed herein detect ambient audio clips of a household or media presentation environment, and such detected audio clips can be queried against a reference library or other reference to detect audience member's activity. This information can be employed to determine or measure a panelist or audience member's attention to media presented in a media presentation environment (e.g., a television) during the detected household clip(s). In some examples, the query results or identified household audio clips enable mapping of a panelist's behavior or daily activity routine and/or attention measurements during media exposure. For example, an audience measurement entity can score or evaluate an attention measurement value of single panelist household with a low attention score when example metering devices disclosed herein detect dish washing activity at the same time that the metering device detects an advertisement on television. Such detection is indicative of the panelist being distracted during presentation of the advertisement. In some examples, an audience measurement entity can determine if a certain media exposure was impacting the panelist's behavior. For example, if the metering device disclosed herein detects a sports car advertisement presented on a media device, detects a normal dishwashing activity interrupted during presentation of the sports advertisement, and detects the dishwashing activity continued after the presentation of the sports car advertisement, the audience measurement entity can score the panelist's attention high in relation to the sports car advertisement. In some examples, an audience measurement entity can determine that a panelist is distracted when detecting an advertisement presented on a television of the household environment and the metering devices disclosed herein detect the panelist answering a cell phone or detect water boiling over in a kitchen of the household.

FIG. 1 is an illustration of an example audience measurement system 100 having an example meter 102 constructed in accordance with the teachings of this disclosure to monitor an example media presentation environment 104. The meter 102 of the illustrated example provides a combination of media (e.g., content) metering and people metering. In some examples, the meter 102 may include a metering device to provide media monitoring functionality and a people meter to provide people metering functionality. In the illustrated example of FIG. 1, the media presentation environment 104 includes panelists 106, 107, and 108, an example media device 110 that receives media from an example media source 112, and the meter 102. The meter 102 identifies the media presented by the media device 110 and reports media monitoring information to an example crediting facility 114 of an audience measurement entity via an example gateway 116 and an example network 118. The example meter 102 of FIG. 1 sends media identification data and/or audience identification data to the crediting facility 114 periodically, a-periodically and/or upon request by the crediting facility 114.

The example gateway 116 of the illustrated example of FIG. 1 is a router that enables the meter 102 and/or other devices in the media presentation environment (e.g., the media device 110) to communicate with the network 118 (e.g., the Internet). In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the meter 102, the media device 110, etc., to transmit and/or receive data via the Internet. Alternatively, the gateway 116 may be coupled to such a LAN. In some examples, the gateway 116 may be implemented with the example meter 102 disclosed herein. In some examples, the gateway 116 may not be provided. In some such examples, the meter 102 may communicate with the crediting facility 114 via cellular communication (e.g., the meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The example crediting facility 114 of the illustrated example is implemented by one or more servers. The example crediting facility 114 processes and stores data received from the meter 102. For example, the crediting facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists. In some examples, the crediting facility 114 of FIG. 1 combines audience identification data, audience attention data, and program identification data from multiple households to generate aggregated media monitoring information.

In examples disclosed herein, an audience measurement entity provides the meter 102 to the panelist 106, 107 and 108 (or household of panelists) such that the meter 102 may be installed by the panelist 106, 107 and 108 by simply powering the meter 102 and placing the meter 102 in the media presentation environment 104 and/or near the media device 110 (e.g., near a television set). In some examples, more complex installation activities may be performed such as, for example, affixing the meter 102 to the media device 110, electronically connecting the meter 102 to the media device 110, etc.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107 and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally, or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107 and 108 of the household have registered with an audience measurement entity (e.g., by agreeing to be a panelist) and have provided their demographic information to the audience measurement entity as part of a registration process to enable associating demographics and attentiveness metrics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household in the illustrated example of FIG. 1, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107 and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example meter 102 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the crediting facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the meter 102, by physically mailing a memory of the meter 102, etc.

The example meter 102 of FIG. 1 is a stationary device that may be disposed on or near the media device 110. The meter 102 of FIG. 1 includes its own housing, processor, memory and/or software to perform the desired audience measurement and/or people monitoring functions.

The meter 102 of the illustrated example of FIG. 1 combines audience measurement data, audience attention data, and people metering data. For example, audience measurement data is determined by monitoring media output by the media device 110 and/or other media presentation device(s), and audience identification data (also referred to as demographic data, people monitoring data, etc.) is determined from people monitoring data provided to the meter 102. In this example, audience attention data is data determined by monitoring household activity (e.g., household noises, ambient audio clips of a household or media presentation environment, etc.). Thus, the example meter 102 provides dual functionality of a content measurement meter to collect content measurement data and people meter to collect and/or associate demographic information corresponding to the collected audience measurement data.

For example, the meter 102 of the illustrated example collects media identifying information and/or data (e.g., signature(s), fingerprint(s), code(s), watermarks, tuned channel identification information, time of exposure information, etc.), household activity data (e.g., signature(s) and/or fingerprint(s) of household noises), and people data (e.g., user identifiers, demographic data associated with audience members, etc.). For example, monitored media can be media content, such as television programs, radio programs, movies, etc., and/or commercials, advertisements, etc. As such, the term "media" includes any type of content and/or advertisement delivered via any type of distribution medium. Thus, media includes television programming or advertisements, radio programming or advertisements, movies, web sites, streaming media, etc.

The media identifying information, household activity data, and the people data can be combined to generate, for example, media exposure data (e.g., ratings data) indicative of amount(s) and/or type(s) of people that were exposed to specific piece(s) of media distributed via the media device 110. To extract media identification data, the meter 102 and/or the example audience measurement system 100 extracts and/or processes the collected media identifying information and/or data received by the meter 102, which can be compared to reference data to perform source and/or content identification. Any other type(s) and/or number of media monitoring techniques can be supported by the meter 102.

The meter 102 may utilize invasive monitoring involving one or more physical connections to the media device 110, and/or non-invasive monitoring not involving any physical connection to the media device 110, to obtain access to one or more media signals corresponding to the media being presented by the media device 110. For example, depending on the type(s) of metering the meter 102 is to perform, the meter 102 can be physically coupled to the media device 110 or may be configured to capture signals emitted externally by the media device 110 (e.g., free field audio) such that direct physical coupling to the media device 110 is not required. For example, the meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 102 of the illustrated example employs audio watermarking techniques and/or signature based-metering techniques. Audio watermarking is a technique used to identify media, such as television broadcasts, radio broadcasts, advertisements (television and/ or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

For example, the meter 102 of the illustrated example senses audio (e.g., acoustic signals or ambient audio) output (e.g., emitted) by the media device 110. For example, the meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the meter 102 of the illustrated example includes an example acoustic sensor 120 (e.g., a microphone). In some examples, the meter 102 may process audio signals obtained from the media device 110 via a direct cable connection to detect media and/or source identifying audio watermarks embedded in such audio signals. In some examples, the meter 102 may process audio signals and/or video signals to generate respective audio and/or video signatures from the media presented by the media device 110.

To generate exposure data for the media, identification(s) of media to which the audience is exposed are correlated with people data (e.g., presence information) collected by the meter 102. The meter 102 of the illustrated example collects inputs (e.g., audience identification data) representative of the identities of the audience member(s) (e.g., the panelists 106, 107 and 108). In some examples, the meter 102 may be configured to receive panelist information via an example input device 122 such as, for example, a remote control, An Apple iPad®, a cell phone, etc.). In such examples, the meter 102 prompts the audience members to indicate their presence by pressing an appropriate input key on the input device 122. For example, the input device may enable the audience member(s) (e.g., the panelists 106, 107 and 108 of FIG. 1) and/or an unregistered user (e.g., a visitor to a panelist household) to input information to the meter 102 of FIG. 1. This information includes registration data to configure the meter 102 and/or demographic data to identify the audience member(s). For example, the input device 122 may include a gender input interface, an age input interface, and a panelist identification input interface, etc.

In some examples, the meter 102 collects audience identification data by periodically or aperiodically prompting audience members in the monitored media presentation environment 104 to identify themselves as present in the audience. In some examples, the meter 102 responds to predetermined events (e.g., when the media device 110 is turned on, a channel is changed, an infrared control signal is detected, etc.) by prompting the audience member(s) to self-identify. Additionally, or alternatively, in some examples, the meter 102 can automatically identify one or more individuals included in an audience in the vicinity of the media device 110 (e.g., via a tag carried by the panelist, infrared scanning, etc.).

The meter 102 of the illustrated example may also determine times at which to prompt the audience members to enter information to the meter 102. In some examples, the meter 102 of FIG. 1 supports audio watermarking for people monitoring, which enables the meter 102 to detect the presence of a panelist-identifying metering device in the vicinity (e.g., in the media presentation environment 104) of the media device 110. In some examples, the acoustic sensor 120 of the meter 102 is able to sense example audio output 124 (e.g., emitted) by an example panelist-identifying metering device 126, such as, for example, a wristband, a cell phone, etc., that is uniquely associated with a particular panelist. The audio output 124 by the example panelist-identifying metering device 126 may include, for example, one or more audio watermarks to facilitate identification of the panelist-identifying metering device 126 and/or the panelist 106 associated with the panelist-identifying metering device 126.

To identify and/or confirm the presence of a panelist present in the media device 110, the example meter 102 of the illustrated example includes an example display 132. For example, the display 132 provides identification of the panelists 106, 107, 108 present in the media presentation environment 104. For example, the meter 102 of the illustrated example displays indicia or visual indicators (e.g., illuminated numerals 1, 2 and 3) identifying and/or confirming the presence of the first panelist 106, the second panelist 107 and the third panelist 108.

The audience identification data and the exposure data can be compiled with the demographic data collected from audience members such as, for example, the panelists 106, 107 and 108 during registration to develop metrics reflecting, for example, the demographic composition of the audience. In some examples, the meter 102 may combine the metering data (e.g., monitored signatures) identifying (e.g., directly or indirectly) the media being presented by the media device 110 with the audience identification data to form audience measurement data characterizing media exposure (e.g., with demographic information) at the site being monitored by the example meter 102.

In addition to determining demographic reach for advertising and media programming based on registered panel members, the example meter 102 of the illustrated example enhances audience measurement data characterizing the media exposure by detecting or determining a viewer or panelist's focus and/or a viewer's attention during a media exposure. To detect or determine a panelist's attention to media exposure, the meter 102 of the illustrated example detects audio (e.g., signatures) corresponding to household noise(s). For example, by detecting or determining audio (e.g., representative of audio signatures) associated with household noise(s) that occur(s) during a media presentation by the media device 110, example audience measurement entities can employ such detected audio or noises to determine if a panelist was paying attention or was distracted during the media presentation (e.g., an attention/distraction scale). For example, the meter 102 of the illustrated example can detect audio signatures or noises during media presentation that can be evaluated or analyzed to determine a panelist's attention or distraction level during the media exposure. In some examples, the crediting facility 114 can adjust media exposure report based on a panelist's attention evaluation score.

For example, the crediting facility 114 determines an audience member attention evaluation score based on the information provided by (e.g., received from) the meter 102. In some examples, the crediting facility 114 determines an audience attention score based on household clips or noises detected by the meter 102 during the media presentation. The panelist evaluation score can be based on a numbering scale (e.g., a scale of between 1 and 10, with 1 being the lowest and 10 being the highest), a binary scale (e.g., if a distraction is detected, do not count, but if a distraction is not detected, count), and/or any other evaluation score or scale. In some examples, the query results or identified household audio clips enable mapping of a panelist's behavior or daily activity routine and/or attention measurements during a media exposure. For example, the crediting facility 114 can score or evaluate an attention measurement value of single panelist household with a low attention score when the meter 102 of the illustrated example detects household clips or audio associated with a dish washing activity at the same time that the meter 102 detects an advertisement presented by the media device 110. Such detection or determining of a panelist activity can be used to determine that the panelist was likely distracted during presentation of the advertisement, thus, resulting in a lower score for such advertisement when generating a report. In some examples, the crediting facility 114 can determine if a certain media exposure was impacting the panelist's behavior. For example, if the meter 102 detects a sports car advertisement presented on the media device 110, an interruption of a dish washing activity during the duration of the advertisement and resuming of the dishwashing activity after the sports car advertisement, the crediting facility 114 can score the panelist's attention high in relation to the sports car advertisement. In some examples, the crediting facility 114 can determine that a panelist is distracted when detecting an advertisement presented on media device 110 of the media presentation environment 104 and the meter 102 detect ambient audio noise(s) corresponding to the panelist answering a cell phone or detects water boiling over in a kitchen of the household.

Example audio associated with household noises includes, but is not limited, to, opening and/or closing of a refrigerator door, beeping of an electronic appliance (e.g., refrigerator, a microwave, a stove, etc.), a door bell, a telephone ringtone, an electric kettle, a fan, an air conditioner, a dishwasher, water flowing, toilet flushing, typing or texting, television tuning on and/or off, dog barking, conversations, and/or any other noise, appliance or human activity associated with, or conducted within a household (e.g., the audience monitoring environment). Such household noises and/or panelist activities are collectively referred to herein as "household clips," ambient audio clips," "ambient audio," etc. For example, there is no limit to the number or type of audio clips associated with a household.

The meter 102 of the illustrated example employs the audio sensor 120 to detect or hear ambient audio clips in the media presentation environment 104 and/or areas or rooms (e.g., a kitchen) adjacent the media presentation environment 104. The detected audio clips can be queried against a reference library or other reference to detect audience member's activity or behavior during presentation of media via the media device 110. The detected household clip(s) can be used to provide information that can be used to determine or measure a panelist or audience member's attention to certain media presented in the media presentation environment 104 (e.g., a television).

Thus, in some examples, the meter 102 does not determine the audience member attention score. For example, the meter 102 of the illustrated example transmits metering data (e.g., signatures, watermarks, etc.) identifying (e.g., directly or indirectly) the media being presented by the media device 110, the audience identification data associated with an audience member or panelist (e.g., the panelist 107), and the ambient audio (e.g., noise(s)) detected in a household or media presentation environment 104 during presentation of the media via the media device 110. The crediting facility 114 compiles this information to form audience measurement data characterizing media exposure. However, in some examples, the meter 102 can be configured to determine the audience member attention score during media presentation and can forward the attention score to the crediting facility 114.

Figure 2:
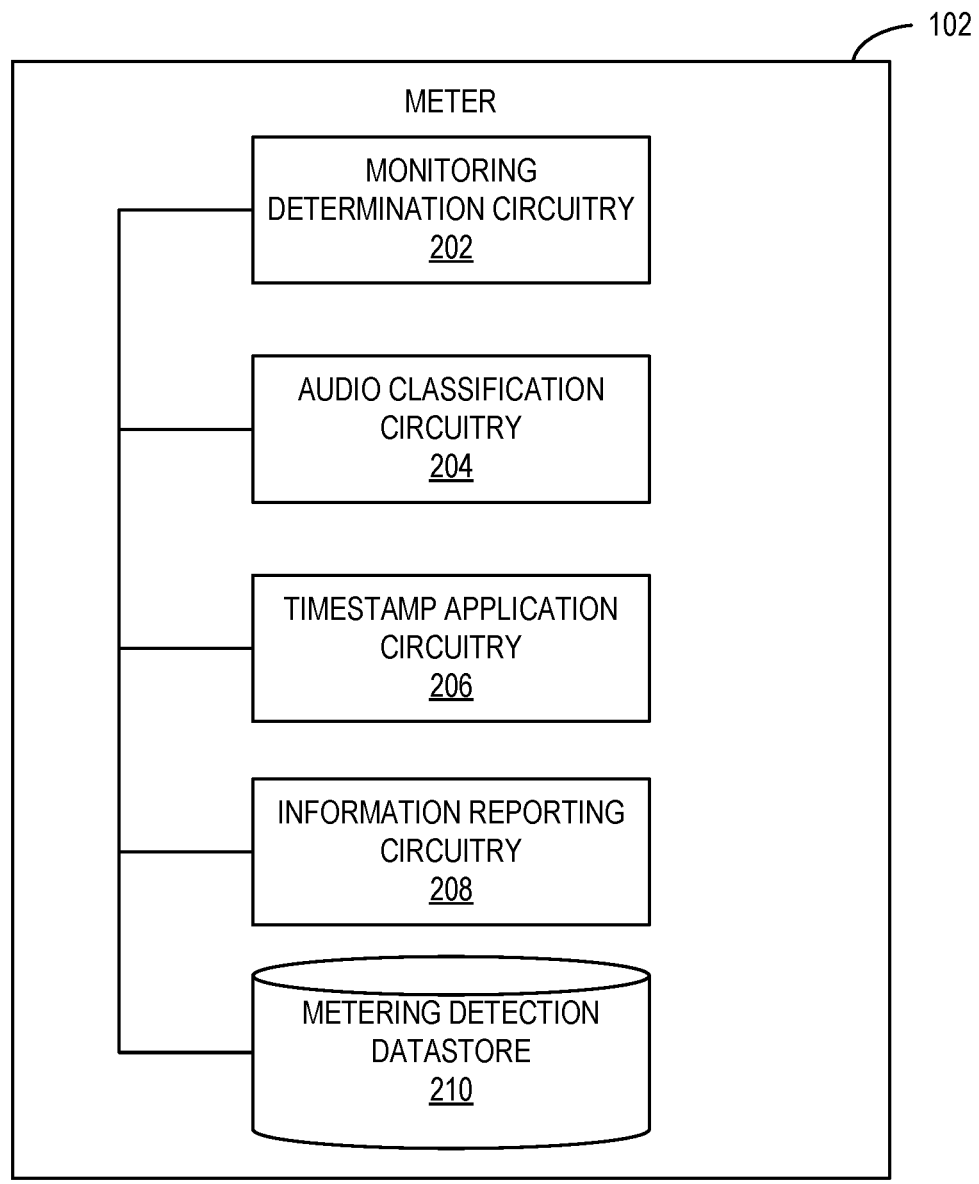
FIG. 2 is a block diagram of an example implementation of the meter of FIG. 1.

FIG. 2 is a block diagram of an example implementation of the example meter 102 of FIG. 1. The example meter 102 of FIG. 2 may be instantiated (e.g., creating an instance of, bring into being for any length of time, materialize, implement, etc.) by processor circuitry such as a central processing unit executing instructions. Additionally or alternatively, the example meter 102 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example meter 102 includes example monitoring determination circuitry 202, example audio classification circuitry 204, example timestamp application circuitry 206, example information reporting circuitry 208, and an example metering detection datastore 210. In some examples, the monitoring determination circuitry 202 is instantiated by processor circuitry executing monitoring determination circuitry 202 instructions and/or configured to perform operations such as those represented by the flowchart of FIG. 4. In some examples, the audio classification circuitry 204 is instantiated by processor circuitry executing audio classification circuitry 204 instructions and/or configured to perform operations such as those represented by the flowchart of FIG. 4. In some examples, the timestamp application circuitry 206 is instantiated by processor circuitry executing timestamp application circuitry 206 instructions and/or configured to perform operations such as those represented by the flowchart of FIG. 4. In some examples, the information reporting circuitry 208 is instantiated by processor circuitry executing information reporting circuitry 208 instructions and/or configured to perform operations such as those represented by the flowchart of FIG. 4.

In FIG. 2, the example monitoring determination circuitry 202 determines if the media device 110 is presenting media.

For example, the meter 102, implementing the monitoring determination circuitry 202, receives audio signals presented by the media device 110 via the audio source 120 of the meter 102. In some examples, the monitoring determination circuitry 202 obtains audio signals from two different inputs. A first input may be a microphone situated and/or located at the speaker of the media device 110 and a second input may be a microphone situated and/or located away from the speaker of the media device 110. In some examples, the monitoring determination circuitry 202 notifies the audio classification circuitry 204 where the audio signals originate from (e.g., the first input or the second input) to identify the audio signal as media or as ambient noise. Alternatively, the example monitoring determination circuitry 202 does not notify the example audio classification circuitry 204 to identify the audio signals obtained and, instead, transmits the audio signals and/or the data representative of the audio signals (e.g., signatures and/or watermarks) to the example central facility 114. In such an example, the central facility 114 classifies the audio signals and/or data representative of the audio signals. For example, if the central facility 114 and/or the credit adjustment system 300 determines a watermark is detected, then the credit adjustment system 300 determines the audio signal is media. Additionally, if the example credit adjustment system 300 obtains a signature from the example meter 102, the example credit adjustment system 300 performs signature matching to determine whether the audio signal is media. For example, if the credit adjustment system 300 determines a signature, representative of the audio signal, matches media in a media reference database, then the audio signal is media. In the example credit adjustment system 300 determines the signature does not match media in the media reference database, then the audio signal is ambient noise.

In some examples, the monitoring determination circuitry 202 notifies the audio classification circuitry 204 that audio has been obtained. In some examples, such a notification enables the audio classification circuitry 204 to begin the process of classifying and/or separating ambient audio corresponding to household activity and audio corresponding to media. In some examples, the monitoring determination circuitry 202 triggers the determination of whether the media device 110 is presenting media because that is the time when it is appropriate to determine an attention of an audience member. If no media is presented via the media device 110, then determining what the audience member is doing in the household may be ineffective with respect to enhancing audience measurement data. For example, monitoring an audience member's household activity while the media device 110 is inactive does not improve crediting an advertisement, because no advertisement is being displayed.

In some examples, the monitoring determination circuitry 202 obtains ambient audio (e.g., clip(s) or noise(s)) (e.g., concurrently with detection of the media) generated or associated with the media presentation environment 104 (e.g., and/or room(s) adjacent the media presentation environment 104). For example, when the monitoring determination circuitry 202 determines that the media device 110 is active, the meter 102 triggers detection of ambient noises in the media presentation environment 104 during presentation of media via the media device 110. As described above, the example monitoring circuitry 202 may obtain audio signals from two inputs, where one input is a microphone located away from the media device 110 to collect noise of the media presentation environment 104. In such an example, the monitoring circuitry 202 notifies the audio classification circuitry 204 that there is ambient noise in the media presentation environment 104 when audio signals are obtained from the input device corresponding to the microphone located away from the media device 110. Alternatively, as described above, the monitoring circuitry 202 notifies the central facility 114 to classify the audio signals based on watermark(s) and/or signature(s).

In some examples, the monitoring determination circuitry 202 includes means for monitoring a media event. For example, the means for monitoring a media event may be implemented by the monitoring determination circuitry 202. In some examples, the monitoring determination circuitry 202 may be instantiated by processor circuitry such as the example processor circuitry 612 of FIG. 6. For instance, the monitoring determination circuitry 202 may be instantiated by the example microprocessor 800 of FIG. 8 executing machine executable instructions such as those implemented by at least blocks 402 of FIG. 4. In some examples, the monitoring determination circuitry 202 may be instantiated by hardware logic circuitry, which may be implemented by an ASIC, XPU, or the FPGA circuitry 900 of FIG. 9 structured to perform operations corresponding to the machine readable instructions. Additionally or alternatively, the monitoring determination circuitry 202 may be instantiated by any other combination of hardware, software, and/or firmware. For example, the monitoring determination circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example audio classification circuitry 204 of the example meter 102 detects media presented by the media device 110 of the media presentation environment 104. For example, the audio classification circuitry 204 distinguishes between the media presented via the media device 110 and noise generated in the media presentation environment 104 using, for example, one or more filters, analog-to-digital converters, comparator(s), etc. In some examples, the audio classification circuitry 204 identifies an origin of the audio signal(s), obtained by the monitoring circuitry 202, to classify the audio signal(s) as ambient noise or media. For example, if the origin of the audio signal is from the first input, representative of a microphone located towards the speaker of the media device 110, then the audio classification circuitry 204 may determine the audio signal is media. In some examples, if the origin of the audio signal is from the second input, representative of a microphone located away from the media device 110, then the audio classification circuitry 204 may determine the audio signal is ambient noise. In some examples, the example audio classification circuitry 204 distinguishes or filters ambient noise (e.g., household clips) from the detected media when media is presented via the media device 110.

In some examples, the audio classification circuitry 204 implements a machine learning model to distinguish the media from ambient noise in the media presentation environment 104. The machine learning model is trained to generate values representative of features in input data (e.g., audio signatures) and uses such feature values to learn to detect when an audio signature is representative of ambient noise (e.g., household clips) or media. For example, the machine learning model is trained with known and/or reference audio signature data (e.g., labelled audio signature data indicative of household clips or media) corresponding to household clips and reference audio signature data corresponding to media. The example machine learning model learns what audio signature data constitutes household clips and what audio signature data constitutes media based on analyzing multiple iterations of audio signature data. For example, the crediting facility 114 (FIG. 1) provides audio signature data to the example audio classification circuitry 204 to determine the features of the audio signature data, and the audio classification circuitry 204 uses the features to determine whether the audio signature data is a household clip or media. For example, the audio classification circuitry 204 detects a household clip based on its training that used known audio signature data as noted above. In some examples, the machine learning model of the audio classification circuitry 204 is trained to detect household clips and input audio signature data that is not classified as a household clip by the machine learning model is treated as potential media for subsequent processing (e.g., using any watermark and/or signature based technique at the crediting facility 114).

In some examples, the machine learning model is trained at the crediting facility 114 and stored in the example metering detection datastore 210 to be accessed by the audio classification circuitry 204. In some examples, the crediting facility 114 periodically or aperiodically updates the machine learning model as new and/or different audio signature data is received. In some examples, when the crediting facility 114 updates the machine learning model, the crediting facility 114 provides the updated machine learning model to the meter 102 to be stored by the metering detection datastore 210.

In some examples, the audio classification circuitry 204 outputs an indication as to whether the detected audio is indicative of media or indicative of a household clip. Additionally or alternatively, the audio classification circuitry 204 outputs an indication as to whether the detected audio is indicative of a household clip or not indicative of a household clip. The example audio classification circuitry 204 may employ the machine learning model, an audio filter, an analog-to-digital converter, a comparator, and/or any type of circuitry that can identify whether the media device 110 is presenting media.

In some examples, the audio classification circuitry 204 includes means for distinguishing between the media presented via the media device and noise generated in the media presentation environment. For example, the means for distinguishing between the media presented via the media device and noise generated in the media presentation environment may be implemented by the audio classification circuitry 204. In some examples, the audio classification circuitry 204 may be instantiated by processor circuitry such as the example processor circuitry 612 of FIG. 6. For instance, the audio classification circuitry 204 may be instantiated by the example microprocessor 800 of FIG. 8 executing machine executable instructions such as those implemented by at least blocks 404, 408 of FIG. 4. In some examples, the audio classification circuitry 204 may be instantiated by hardware logic circuitry, which may be implemented by an ASIC, XPU, or the FPGA circuitry 900 of FIG. 9 structured to perform operations corresponding to the machine readable instructions. Additionally or alternatively, the audio classification circuitry 204 may be instantiated by any other combination of hardware, software, and/or firmware. For example, the audio classification circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 1, the example timestamp application circuitry 206 provides time identifying information (e.g., a timestamp or other indicator) that correlates with corresponding detected audio associated with the media presented via the media device 110 (e.g., detected by the audio classification circuitry 204). For example, the meter 102 (and/or crediting facility 114) generates timestamps associated with the detected audio (e.g., such as day and/or time-of-day information). In some examples, the timestamp application circuitry 206 stores the timestamp in the metering detection datastore 210 in association with the detected audio corresponding to media. For example, the timestamp application circuitry 206 maps the detected audio to a respective timestamp. Additionally or alternatively, the timestamp application circuitry 206 tags the detected audio with the respective timestamp.

In some examples, the timestamp application circuitry 206 provides time identifying information (e.g., a timestamp or other indicator) that correlates to the detected ambient audio (e.g., the audio clip(s) or noise(s)) associated with the media presentation environment 104. For example, the timestamp application circuitry 206 generates timestamps when ambient audio is detected and classified by the audio classification circuitry 204. In some examples, the timestamp application circuitry 206 stores the timestamp in the metering detection datastore 210 in association with the detected audio corresponding to ambient noise. For example, the timestamp application circuitry 206 maps the detected audio to a respective timestamp. Additionally or alternatively, the timestamp application circuitry 206 tags the detected audio with the respective timestamp.

In some examples, the timestamp application circuitry 206 includes means for timestamping detected audio. For example, the means for timestamping detected audio may be implemented by the timestamp application circuitry 206. In some examples, the timestamp application circuitry 206 may be instantiated by processor circuitry such as the example processor circuitry 612 of FIG. 6. For instance, the timestamp application circuitry 206 may be instantiated by the example microprocessor 800 of FIG. 8 executing machine executable instructions such as those implemented by at least blocks 406, 410 of FIG. 4. In some examples, the timestamp application circuitry 206 may be instantiated by hardware logic circuitry, which may be implemented by an ASIC, XPU, or the FPGA circuitry 900 of FIG. 9 structured to perform operations corresponding to the machine readable instructions. Additionally or alternatively, the timestamp application circuitry 206 may be instantiated by any other combination of hardware, software, and/or firmware. For example, the timestamp application circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example information reporting circuitry 208 reports the timestamped information to the crediting facility 114. For example, the information reporting circuitry 208 may periodically or aperiodically retrieve the timestamped audio (e.g., media audio and/or ambient noise) from the metering detection datastore 210 and package (e.g., encode) the information for sending to the crediting facility 114. The example information reporting circuitry 208 sends the timestamped information to the example crediting facility 114 via the example network 118 (FIG. 1). In some examples, the information reporting circuitry 208 implements an interface, such as a network interface card (NIC), a smart NIC, an application programming interface (API), and/or any other type of interface circuitry that can communicate over the network 118 with the crediting facility 114.

In some examples, the information reporting circuitry 208 includes means for reporting detected media and/or detected ambient noise. For example, the means for reporting detected media and/or detected ambient noise may be implemented by the information reporting circuitry 208. In some examples, the information reporting circuitry 208 may be instantiated by processor circuitry such as the example processor circuitry 612 of FIG. 6. For instance, the information reporting circuitry 208 may be instantiated by the example microprocessor 800 of FIG. 8 executing machine executable instructions such as those implemented by at least block 412 of FIG. 4. In some examples, the information reporting circuitry 208 may be instantiated by hardware logic circuitry, which may be implemented by an ASIC, XPU, or the FPGA circuitry 900 of FIG. 9 structured to perform operations corresponding to the machine readable instructions. Additionally or alternatively, the information reporting circuitry 208 may be instantiated by any other combination of hardware, software, and/or firmware. For example, the information reporting circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example meter 102 includes the example metering detection datastore 210 to store timestamped audio corresponding to ambient noise and/or media and one or more machine learning model(s). For example, the metering detection datastore 210 stores audio signatures that have been timestamped by the timestamp application circuitry 206 and machine learning model(s) provided by the crediting facility 114. In some examples, the metering detection datastore 210 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The metering detection datastore 210 can additionally or alternatively be implemented by one or more double data rate (DDR) memories, such as DDR, DDR2, DDR3, DDR4, mobile DDR (mDDR), etc. The metering detection datastore 210 can additionally or alternatively be implemented by one or more mass storage devices such as hard disk drive(s), compact disk drive(s), digital versatile disk drive(s), solid-state disk drive(s), etc. While in the illustrated example the metering detection datastore 210 is illustrated as a single datastore, the metering detection datastore 210 can be implemented by any number and/or type(s) of datastores. Furthermore, the data stored in the metering detection datastore 210 can be in any data format such as, for example, binary data, comma delimited data, tab delimited data, structured query language (SQL) structures, etc.

Figure 3:
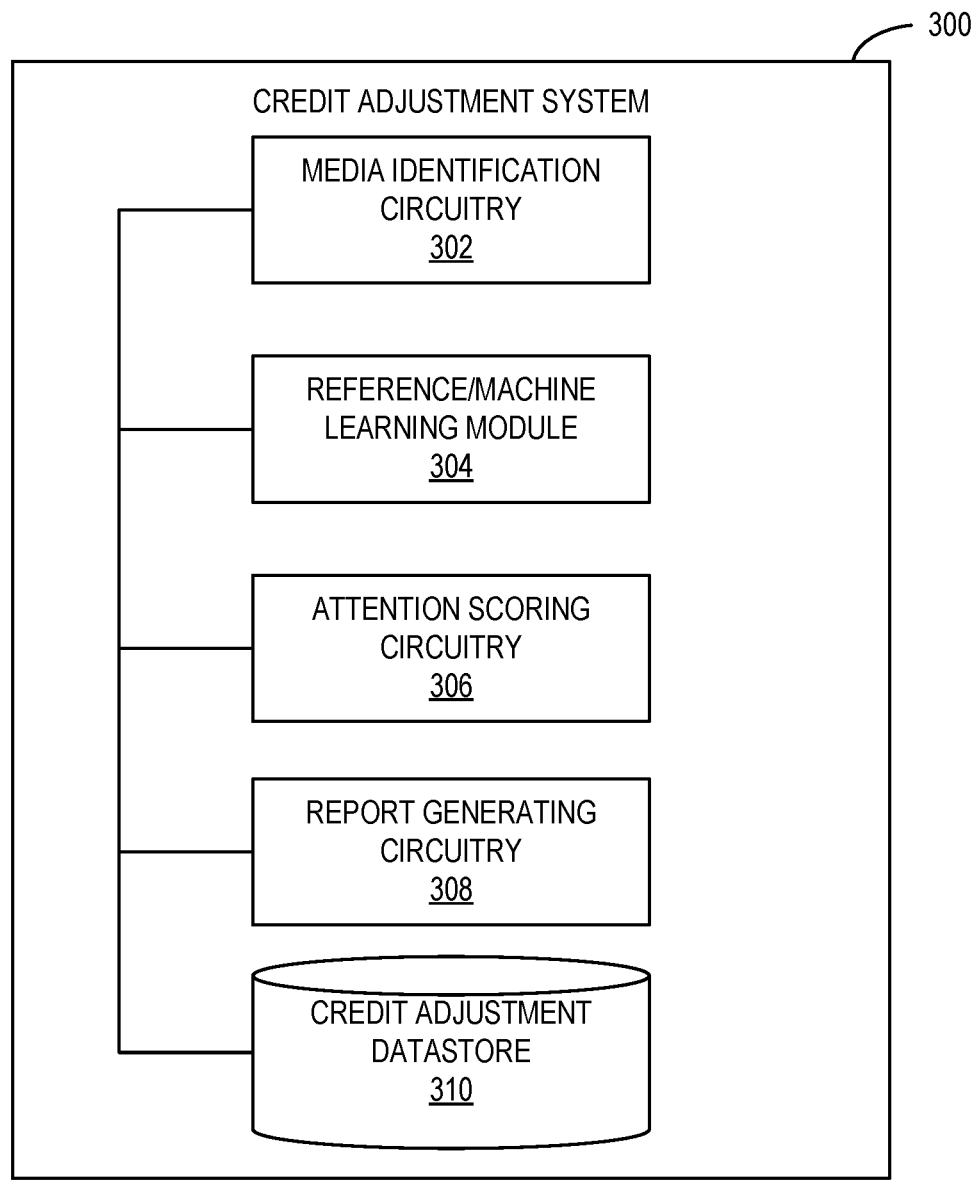
FIG. 3 is an example block diagram of an example crediting adjusting system included in the example crediting facility of FIG. 1.

Turning to FIG. 3, the crediting facility 114 can compare an occurrence of the ambient audio corresponding to the audio clip(s) or noise(s) and the audio corresponding to the media presented by the media device 110 via the time identifying information. The comparison can be used adjust a score of an audience measurement report based on a determination of whether the detected ambient audio (overlapping the media presentation based on the time identifying information) was distractive or not distractive to the viewer or panelist.

FIG. 3 is a block diagram of an example credit adjustment system 300 of the example crediting facility 114 of FIG. 1. The credit adjustment system 300 of FIG. 3 may be instantiated (e.g., creating an instance of, bring into being for any length of time, materialize, implement, etc.) by processor circuitry such as a central processing unit executing instructions. Additionally or alternatively, the credit adjustment system 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The credit adjustment system 300 of FIG. 3 includes example media identification circuitry 302, an example reference/ML module 304, example attention scoring circuitry 306, example report generating circuitry 308, and an example credit adjustment datastore 310. In some examples, the media identification circuitry 302 is instantiated by processor circuitry executing media identification circuitry 302 instructions and/or configured to perform operations such as those represented by the flowchart of FIG. 5. In some examples, the reference/ML module 304 is instantiated by processor circuitry executing reference/ML module 304 instructions and/or configured to perform operations such as those represented by the flowchart of FIG. 5. In some examples, the attention scoring circuitry 306 is instantiated by processor circuitry executing attention scoring circuitry 306 instructions and/or configured to perform operations such as those represented by the flowchart of FIG. 5. In some examples, the reporting generating circuitry 308 is instantiated by processor circuitry executing reporting generating circuitry 308 instructions and/or configured to perform operations such as those represented by the flowchart of FIG. 5.

In FIG. 3, the example credit adjustment system 300 includes the example media identification circuitry 302 to receive, obtain, or otherwise access information from the meter 102 (FIG. 1) relating to the detected media and household clips of the media presentation environment 104 (FIG. 1). The media identification circuitry 302 employs signature matching techniques, watermark techniques, metadata techniques, and/or any other media identifying technique(s) to identify media obtained from the meter 102 (e.g., obtained from the information reporting circuitry 208 of FIG. 2). For example, the media identification circuitry 302 obtains monitored signatures, fingerprints, watermarks, (e.g., audio monitored by the meter 102), etc., and compares and/or matches the monitored signatures, fingerprints, watermarks to reference signatures (e.g., reference signatures generated from reference audio) to identify the media. In some examples, media identification includes identifying and/or determining a tuning station, a media title, an original media distributor, etc.

In FIG. 3, the example credit adjustment system 300 includes the example reference/ML module 304 to determine or identify a type of noise or activity (e.g., household clips) associated with the detected or recorded ambient audio. In this example, the reference/ML module 304 of the crediting facility 114 can employ: (1) a universal library; (2) a neural network; (3) an adaptive/passive system; and/or (4) any other reference identification system. In some examples, to determine or identify a type of noise or activity (e.g., household clips) associated with the detected or recorded ambient audio, the reference/ML module 304 of the crediting facility 114 can employ only one or a combination of two or more of (1) the universal library; (2) the neural network; (3) the adaptive/passive system; and/or (4) any other reference identification system.

When employing a universal library, the example reference/ML module 304 and/or the example crediting facility 114 creates or obtains a library of various, predetermined reference audio identifiers (e.g., household clips) that typically occur in a household or a presentation environment (e.g., the media presentation environment 104). In some examples, the library can be a datastore of audio signatures (e.g., reference signatures generated by a signature generator(s) of the credit facility 114) that can be used (e.g., by the example crediting facility 114) to identify corresponding housing clip(s) or noise(s) detected by the meter 102 of the media presentation environment 104. For example, the library can include audio fingerprints or signatures corresponding to household clip(s) or noise(s) associated with, for example, telephone ringing, conversation, water flowing, water boiling, toilet flushing, doorbell ringing, a fan motor, a door opening, a door closing, a person walking, and/or any other household clip(s) associated with the media presentation environment 104. In some examples, the reference/ML module 304 and/or the crediting facility 114 generates and/or manages (e.g., updates) the library or datastore with various audio fingerprints or signatures associated with various household noises or clips on an ongoing basis. For example, the reference/ML module 304 may be provided with and/or determine new (e.g., not previously identified) audio clips on an ongoing basis. As such, the example reference/ML module 304 periodically and/or aperiodically updates the library with the new reference audio signatures in order to enhance and/or improve the detection and identification of household clips. In some examples, the reference/ML module 304 and/or the crediting facility 114 identifies the household clip when the reference/ML module 304 and/or the crediting facility 114 identifies a match or substantial match between the reference audio signature from the library and a measured (e.g., monitored) audio signature detected by the meter 102 and/or the monitoring determination circuitry 202 of the media presentation environment 104. A match or substantial match disclosed herein includes, for example, a frequency, amplitude, or pattern profile of the reference signature matching 90% or more of a frequency, amplitude, or pattern profile of the measured (e.g., monitored) or detected household clip detected by the meter 102 and/or the monitoring determination circuitry 202. For example, the reference/ML module 304 compares the monitored audio signature to one or more reference audio signatures stored in the example credit adjustment datastore 310 to determine a match. To determine the match, the example reference/ML module 304 compares at least one of the frequency, amplitude, or pattern profile of the monitored audio signature to at least one of the frequency, amplitude, or pattern profile of one or more reference audio signature(s).

In some examples, the reference/ML module 304 employs a neural network system to identify or classify a household clip (e.g., audio or ambient noise) generated in the media presentation environment 104. In some examples, the reference/ML module 304 employs an adaptive reference system to identify or classify a household clip. In some examples, the reference/ML module 304 employs both a neural network system and an adaptive reference system to identify or classify a household clip. In such examples, the reference/ML module 304 employs artificial intelligence to identify or classify a household clip (e.g., audio or ambient noise) generated in the media presentation environment 104.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For example, the model may be trained with data to recognize patterns and/or associations and follow such patterns and/or associations when processing input data such that other input(s) result in output(s) consistent with the recognized patterns and/or associations. Such training data includes reference audio signatures that have been pre-labelled with the household noise classification (e.g., phone ringing, water flowing, water boiling, toilet flushing, doorbell ringing, a fan motor, a door opening, a door closing, a person walking, and/or any other household clip(s)). As such, the model is trained to recognize patterns in monitored audio signatures that are associated with patterns in the reference audio signatures.

Many different types of machine learning models and/or machine learning architectures exist. In examples disclosed herein, a deep learning model is used. Using a deep learning model enables millions of parameters or reference signals to be used to increase an accuracy of identifying activities associated with ambient noise(s) detected by the meter 102. In general, machine learning models/architectures that are suitable to use in the example approaches disclosed herein will be Deep Neural Network (DNN). However, other types of machine learning models could additionally or alternatively be used such as Convolutional Neural Network (CNN), Recurrent Neural Network (RNN), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using deep learning algorithm, a decision tree algorithm, a naive bayes algorithm. However, any other training algorithm may additionally or alternatively be used. In examples disclosed herein, training is performed for a specific duration, a day, a week, a month, etc. In examples disclosed herein, training is performed at the crediting facility 114. Training is performed using hyperparameters that control how the learning is performed (e.g., a learning rate, a number of layers to be used in the machine learning model, etc.).

Training is performed using training data. In examples disclosed herein, the training data originates from publicly available data, locally generated data, audio signatures generated by the crediting facility 114, etc. Because supervised training is used, the training data is labeled.

During training, the meter 102 receives, via the audio source 120, ambient noises generated in the media presentation environment 104 and sends the audio signals representative of the generated noises to the crediting facility 114. The training period can occur over a predetermined time duration (e.g., one day, one week, a month, six months, etc.). After the neural network has completed training, In some examples, the meter 102 undergoes a training period to train the neural network. During training, the meter 102 detects if the media device 110 is in a power state of off or on. If the media device 110 is on, the training does not initiate or the training pauses. If the media device 110 is off, the training commences or resumes. After the training period expires, the training of the model ceases.

Once training is complete, the example reference/ML module 304 downloads the trained model to the example meter 102. For example, the reference/ML module 304 downloads and stores the trained model at the metering detection datastore 210. The trained model is deployed for use as an executable construct that processes an input and provides an output based on the network of nodes and connections defined in the model. The model is stored at the crediting facility 114 or the meter 102. The model may then be executed by the crediting facility 114 and/or the meter 102. For example, the model is stored by the credit adjustment datastore 310 and executed by the reference/ML module 304. In some examples, the model is stored by the metering detection datastore 210 and executed by the meter 102 and/or the audio classification circuitry 204.

Once trained, the deployed model may be operated in an inference phase to process data (e.g., monitored audio signatures). In the inference phase, data to be analyzed (e.g., live data corresponding to monitored audio signatures) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, a neural network system of the reference/ML, module 304 can be employed to identify a type of noise or activity associated with the detected or recorded ambient audio generated in the media presentation environment 104. For example, the neural network can be trained to include a large amount of reference signals (e.g., reference signatures, household clip signatures, etc.) representative of different noises or sounds that can be generated in a media presentation environment such as the media presentation environment 104. The neural network can receive a household audio clip(s) from the meter 102 and identify an activity associated with the household audio clip detected by the meter 102. For example, the neural network can be a large, deep learning algorithm. For example, the deep learning algorithm can be trained to include millions of parameters (e.g., audio sounds, audio signatures, audio fingerprints, etc.) representative of audio clips as references and the neural network can employ these reference parameters when receiving audio clips from the meter to determine or identify an activity associated with the household audio clip generated in the media presentation environment 104 and received by the meter 102. Such identified noise can be employed by the crediting facility 114 to determine an attention score of a viewer when viewing media presented by the media device 110 when the household audio clip is detected by the meter 102.

In some examples, the reference/ML module 304 of the crediting facility 114 can employ an adaptive reference system. The adaptive reference system is a machine learning system that is trained based on the actual audio clips or noises (e.g., previous and successive ambient audio) generated in the media presentation environment 104 and detected by the meter 102. Specifically, the adaptive reference system of the illustrated example employs a classification system. For example, the adaptive reference system can provide a first classification of household clips that can be distractive to a viewer and a second classification of household clips that are not distractive to a viewer. For example, the reference/ML module 304 employs a decision tree algorithm to classify detected ambient noises or household clips into distractive noises or non-distractive noises. Thus, the adaptive reference system does not identify an actual activity associated with a detected or measured audio but determines if the detected noise could be distractive to a viewer of a media device or whether the detected noise is not distractive. For example, during a training period, the meter 102 detects and records household audio clips generated in the media presentation environment 104. The detected household audio clips or noise generated and detected by the meter 102 are sent to the reference/ML, module 304, which classifies the detected household audio clips as either distractive or not distractive.

In some examples, the reference/ML, module 304 analyzes a duration of the detected, a level of sound, a spectrum (e.g., a frequency spectral content) of the sound, and/or any other pattern or characteristic associated with the sound to determine which classification to categorize a detected noise. For example, the reference/ML, module 304 evaluates a characteristic, such as a consistency (e.g., continuous, regular, steady, etc.) and/or inconsistency (e.g., occasional, intermittent, irregular, etc.), of the presence of the noise that is detected. In some examples, evaluating the consistency or inconsistency or, more generally, the presence characteristic of the noise includes determining whether the noise was present consistently over a period of time, or inconsistently over the period of time. In some examples, the reference/ML, module 304 compares the presence characteristic of the noise to a threshold presence to determine consistency. In some examples, the reference/ML, module 304 determines the presence characteristic of the ambient noise to be a percentage of the presence of the noise over a period of time (e.g., 30 minutes, one hour, one day, etc.), and compares the percentage to a threshold percentage of time (e.g., 90% of the period of time, 10% of the period of time, etc.). For example, if the reference/ML, module 304 determines that over a span of an hour, the noise has been present for at least 54 minutes of the 60 minutes, and the threshold percentage is 90%, then the reference/ML, module 304 determines that the presence characteristic of the noise satisfies the threshold. In some examples, such a threshold is used to determine that the noise is consistent and, thus, not distractive. In some examples, if the presence of the noise does not satisfy the threshold, then the reference/ML, module 304 determines that the noise is inconsistent and, thus, distractive. For example, if an air conditioner unit starts and stops frequently (e.g., consistently) over the course of a day, the identified noise is likely not to be distractive to the viewer. In some examples, the reference/ML module 304 classifies a noise associated with a motor of a fan (e.g., a ceiling fan) generating a constant (e.g., consistent), low frequency sound as a non-distractive noise or activity.

However, if the presence characteristic of the ambient noise is inconsistently present, is pulsating or is loud, the reference/ML module 304 (e.g., adaptive reference system) classifies the noise as distractive. For example, the reference/ML module 304 classifies noise associated with a telephone ringing or a door bell (e.g., sporadic noise) as distractive noise, because the presence of a telephone ringing noise or a door bell noise is inconsistent over the course of a day (as determined by a threshold or percentage corresponding to an inconsistent presence). In some examples, if the ambient noise is a constant, beeping noise at short-spaced intervals, the noise can be representative of a refrigerator door being opened, a washer or dryer indicating a completed load cycle, a dishwasher notification of completion, etc. In some examples, such a detected constant, beeping noise may be followed by ambient noise representative of a door opening, etc. Thus, in some examples, the reference/ML module 304 may require and/or use successive noises to classify the noise(s) as a distractive. For example, a detected constant, beeping noise followed by a detected door opening or door closing noise qualifies as a distractive classification. In other words, the reference/ML module 304 may need two or more successive and different noises to classify the noise as a distractive.

Thus, during a training period, the neural network of the reference/ML module 304 detects a presence of noises in the media presentation environment 104 to determine whether the noises are consistent, such as noises that occur frequently, have low volume (e.g., noise that does not exceed a decibel threshold), or other characteristics, etc., and classifies such noises as "not distractive" noises. Conversely, the neural network of the reference/ML module 304 detects a presence of noises in the media presentation environment 104 to determine whether they are inconsistent, such as noises that occur sporadically, have a high volume (e.g., noise that exceeds a decibel threshold), high spectrum (e.g., frequency spectral content), or other characteristics, etc. After the neural network of the reference/ML module 304 is trained by identifying and classifying detected noises in the media presentation environment 104, the neural network can be downloaded and deployed for use. Thus, after the adaptive reference system is trained, subsequent detected noises in the media presentation environment 104 by the meter 102 are noises previously detected during the training period.

In some examples, the reference/ML module 304 includes means for identifying media or household activity associated with an audio signature. For example, the means for identifying media or household activity associated with an audio signature may be implemented by reference/ML module circuitry 304. In some examples, the reference/ML module 304 may be instantiated by processor circuitry such as the example processor circuitry 712 of FIG. 7. For instance, the reference/ML module 304 may be instantiated by the example microprocessor 800 of FIG. 8 executing machine executable instructions such as those implemented by at least blocks 506, 508, 510 of FIG. 5. In some examples, the reference/ML module 304 may be instantiated by hardware logic circuitry, which may be implemented by an ASIC, XPU, or the FPGA circuitry 900 of FIG. 9 structured to perform operations corresponding to the machine readable instructions. Additionally or alternatively, the reference/ML module 304 may be instantiated by any other combination of hardware, software, and/or firmware. For example, the reference/ML module 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 3, the example credit adjustment system 300 includes the example attention scoring circuitry 306 to determine an audience member attention evaluation score based on the information provided by (e.g., received from) the meter 102. For example, the crediting facility 114 and/or the attention scoring circuitry 306 determine an audience attention score based on an output of the reference/ML module 304. For example, the attention scoring circuitry 306 obtains a household activity classification from the reference/ML module 304 (e.g., when the reference/ML module 304 employs a universal library or a neural network) and determines an attention measurement value based on the household activity. In some examples, the attention scoring circuitry 306 obtains a "distractive" or "non-distractive" classification from the reference/ML module 304 (e.g., when the reference/ML module 304 employs an adaptive reference system) and determines an attention measurement value based on the "distractive" or "non-distractive" output. The attention measurement value can be based on a numbering scale (e.g., a scale of between 1 and 10, 1 being the lowest and 10 being the highest), a binary scale (e.g., if a distraction is detected, do not count, if a distraction is not detected, count), and/or any other evaluation score or scale. In some examples, if the household activity is indicative of dish washing or if the output is "distractive," the attention scoring circuitry 306 generates a low attention measurement value. In some examples, if the household activity is indicative of a fan or if the output is "non-distractive," the attention scoring circuitry 306 generates a high attention measurement value.

In some examples, the attention scoring circuitry 306 uses the household activity classification and attention scores to track an audience member's behavior. In some examples, the attention scoring circuitry 306 tracks the audience member's behavior to determine daily activity routine(s) of the audience member. In some examples, the attention scoring circuitry 306 tracks the audience member's behavior by storing the household activity classifications in the example credit adjustment datastore 310 with associated timestamps. In some examples, the attention scoring circuitry 306 determines whether the household activity occurs regularly at the same time each day to determine a household routine of the audience member. In some examples, the attention scoring circuitry 306 uses the daily activity routine(s) of the audience member to generate the attention score. For example, the attention scoring circuitry 306 and/or the crediting facility 114 can score or evaluate an attention measurement value of single audience member household with a low attention score when the reference/ML, module 304 detects and/or determines that a household clip(s) or audio is/are associated with a dish washing activity at the same time that the meter 102 detects an advertisement presented by the media device 110. The example attention scoring circuitry 306 uses the detection or determining of a panelist activity to determine that the panelist was likely distracted during presentation of the advertisement, thus, resulting in a lower score for such advertisement when generating a report.

In some examples, the attention scoring circuitry 306 and/or the crediting facility 114 determines if a certain media exposure was impacting the panelists behavior. For example, if the meter 102 detects a sports car advertisement presented on the media device 110, an interruption of a dish washing activity during the duration of the advertisement and resuming of the dishwashing activity after the sports car advertisement, the attention scoring circuitry 306 scores the panelist's attention very high in relation to the sports car advertisement. In some examples, the attention scoring circuitry 306 can determine that a panelist is distracted in response to obtaining a detection of an advertisement presented on media device 110 and obtaining a detection of ambient audio noise(s) corresponding to the panelist answering a cell phone.

In some examples, the attention scoring circuitry 306 includes means for generating an attention score corresponding to an attention of an audience member. For example, the means for generating an attention score corresponding to an attention of an audience member may be implemented by attention scoring circuitry 306. In some examples, the attention scoring circuitry 306 may be instantiated by processor circuitry such as the example processor circuitry 712 of FIG. 7. For instance, attention scoring circuitry 306 may be instantiated by the example microprocessor 800 of FIG. 8 executing machine executable instructions such as those implemented by at least blocks 512, 514 of FIG. 5. In some examples, the attention scoring circuitry 306 may be instantiated by hardware logic circuitry, which may be implemented by an ASIC, XPU, or the FPGA circuitry 900 of FIG. 9 structured to perform operations corresponding to the machine readable instructions. Additionally or alternatively, the attention scoring circuitry 306 may be instantiated by any other combination of hardware, software, and/or firmware. For example, the attention scoring circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 3, the example credit adjustment system 300 includes the example report generation circuitry 308 to adjust the audience measurement data based on the determined audience attention evaluation score. For example, the report generation circuitry 308 increases or decreases a hit score of the audience measurement data based on the audience attention score. As used herein, a hit score is a score corresponding to an advertisement hitting key performance indicators. For example, a hit score indicates how many people are viewing and acting on (e.g., clicking, calling, buying, etc.) advertisements in comparison to how many people are viewing the advertisements. In some examples, if the attention scoring circuitry 306 determines that an audience member is distracted while an advertisement is presented, the report generating circuitry 308 decreases a hit score related to the advertisement. In some examples, if the attention scoring circuitry 306 does not determine that an audience member is distracted while an advertisement is presented, the report generating circuitry 308 increases a hit score related to the advertisement. The example report generating circuitry 308 can more accurately determine a viewer's attention to a specific advertisement or other media presented via the media device 110.

In some examples, the report generating circuitry 308 includes means for adjusting an audience measurement report based on an audience attention score. For example, the means for adjusting an audience measurement report based on an audience attention score may be implemented by report generating circuitry 308. In some examples, the report generating circuitry 308 may be instantiated by processor circuitry such as the example processor circuitry 712 of FIG. 7. For instance, report generating circuitry 308 may be instantiated by the example microprocessor 800 of FIG. 8 executing machine executable instructions such as those implemented by at least blocks 516, 518 of FIG. 5. In some examples, the report generating circuitry 308 may be instantiated by hardware logic circuitry, which may be implemented by an ASIC, XPU, or the FPGA circuitry 900 of FIG. 9 structured to perform operations corresponding to the machine readable instructions. Additionally or alternatively, the report generating circuitry 308 may be instantiated by any other combination of hardware, software, and/or firmware. For example, the report generating circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 3, the example credit adjustment system 300 includes the example credit adjustment datastore 310 to store detected and timestamped audio signals (e.g., audio signatures, audio clips, etc.), audience attention scores, and machine learning models. For example, the credit adjustment datastore 310 stores media and ambient noise provided by the meter 102 (e.g., the information reporting circuitry 208), machine learning models periodically trained and updated to classify ambient noise into particular household activities, and audience attention scores determined by the attention scoring circuitry 306. In some examples, the credit adjustment datastore 310 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The credit adjustment datastore 310 can additionally or alternatively be implemented by one or more double data rate (DDR) memories, such as DDR, DDR2, DDR3, DDR4, mobile DDR (mDDR), etc. The credit adjustment datastore 310 can additionally or alternatively be implemented by one or more mass storage devices such as hard disk drive(s), compact disk drive(s), digital versatile disk drive(s), solid-state disk drive(s), etc. While in the illustrated example the credit adjustment datastore 310 is illustrated as a single datastore, the credit adjustment datastore 310 can be implemented by any number and/or type(s) of datastores. Furthermore, the data stored in the credit adjustment datastore 310 can be in any data format such as, for example, binary data, comma delimited data, tab delimited data, structured query language (SQL) structures, etc.

While an example manner of implementing the meter 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the monitoring determination circuitry 202, the audio classification circuitry 204, the timestamp application circuitry 206, the information reporting circuitry 208, the metering detection datastore 210, and/or, more generally, the example meter 102 of FIG. 2, may be implemented by hardware alone or by hardware in combination with software and/or firmware. Thus, for example, any of the example monitoring determination circuitry 202, the audio classification circuitry 204, the timestamp application circuitry 206, and the information reporting circuitry 208, and/or, more generally, the example meter 102 of FIG. 2 could be implemented by processor circuitry, analog circuit(s), digital circuit(s), logic circuit(s), programmable processor(s), programmable micro-controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example meter 102 of FIG. 2, may include one or more elements, processes, and/or devices in addition to, or instead of, those illustrated in FIG. 2, and/or may include more than one of any or all of the illustrated elements, processes and devices.

While an example manner of implementing the crediting facility 114 of FIG. 1 is illustrated in FIG. 3, one or more of the elements, processes, and/or devices illustrated in FIG. 3 may be combined, divided, re-arranged, omitted, eliminated, and/or implemented in any other way. Further, the example media identification circuitry 302, the reference/ML module 304, the attention scoring circuitry 306, the report generating circuitry, the credit adjustment datastore 310, and/or more generally the credit adjustment system 300 of FIG. 3, may be implemented by hardware alone or by hardware in combination with software and/or firmware. Thus, for example, any of the example media identification circuitry 302, the reference/ML module 304, the attention scoring circuitry 306, the report generating circuitry, the credit adjustment datastore 310, and/or, more generally, the example credit adjustment system 300 of FIG. 3 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example credit adjustment system 300 of FIG. 3, may include one or more elements, processes, and/or devices in addition to, or instead of, those illustrated in FIG. 3, and/or may include more than one of any or all of the illustrated elements, processes and devices.

Figure 4:
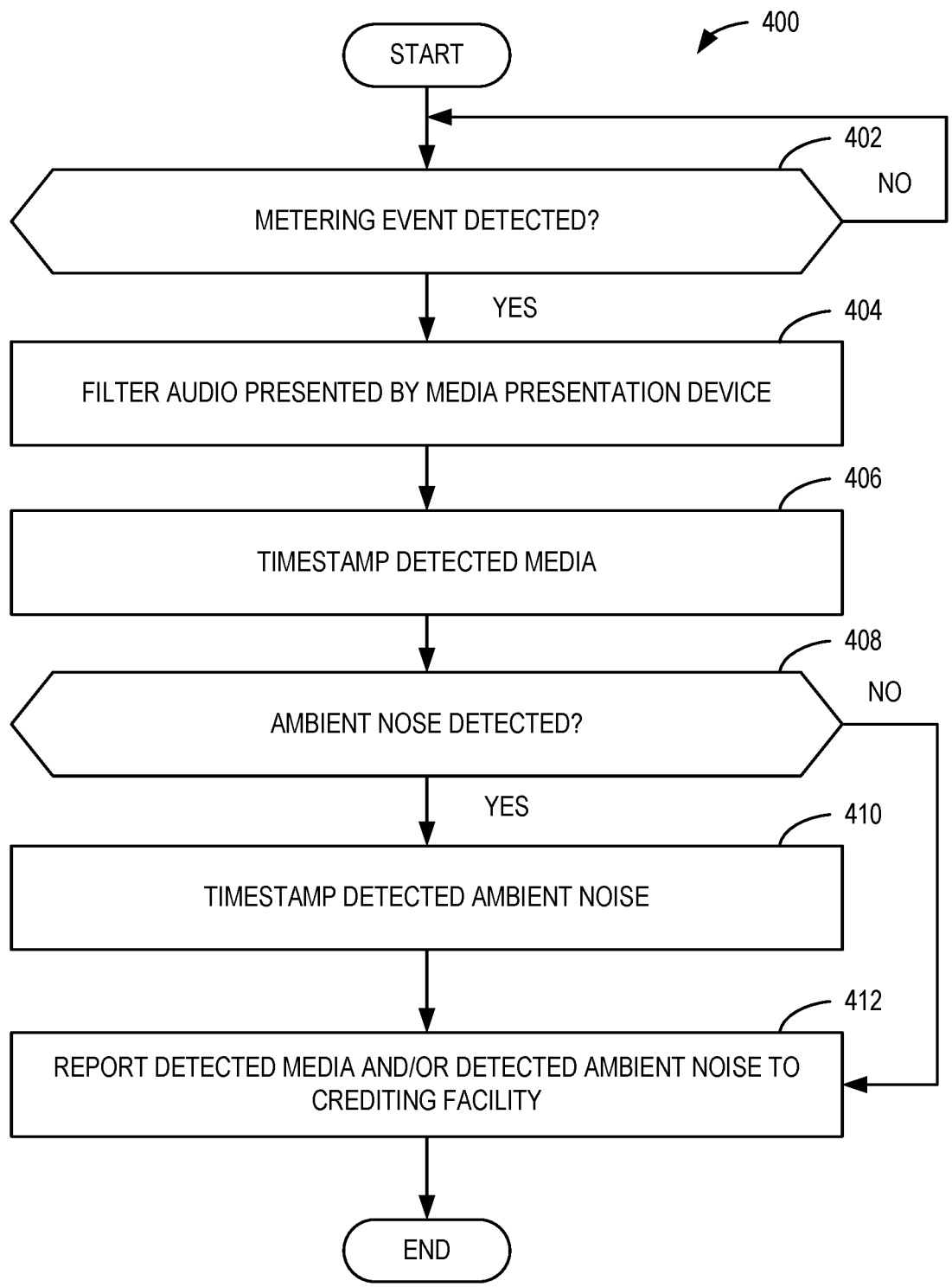
FIG. 4 is a flowchart representative of example machine readable instructions and/or example operations that may be executed by example processor circuitry to implement the meter of FIGS. 1 and/or 2.
Figure 5:
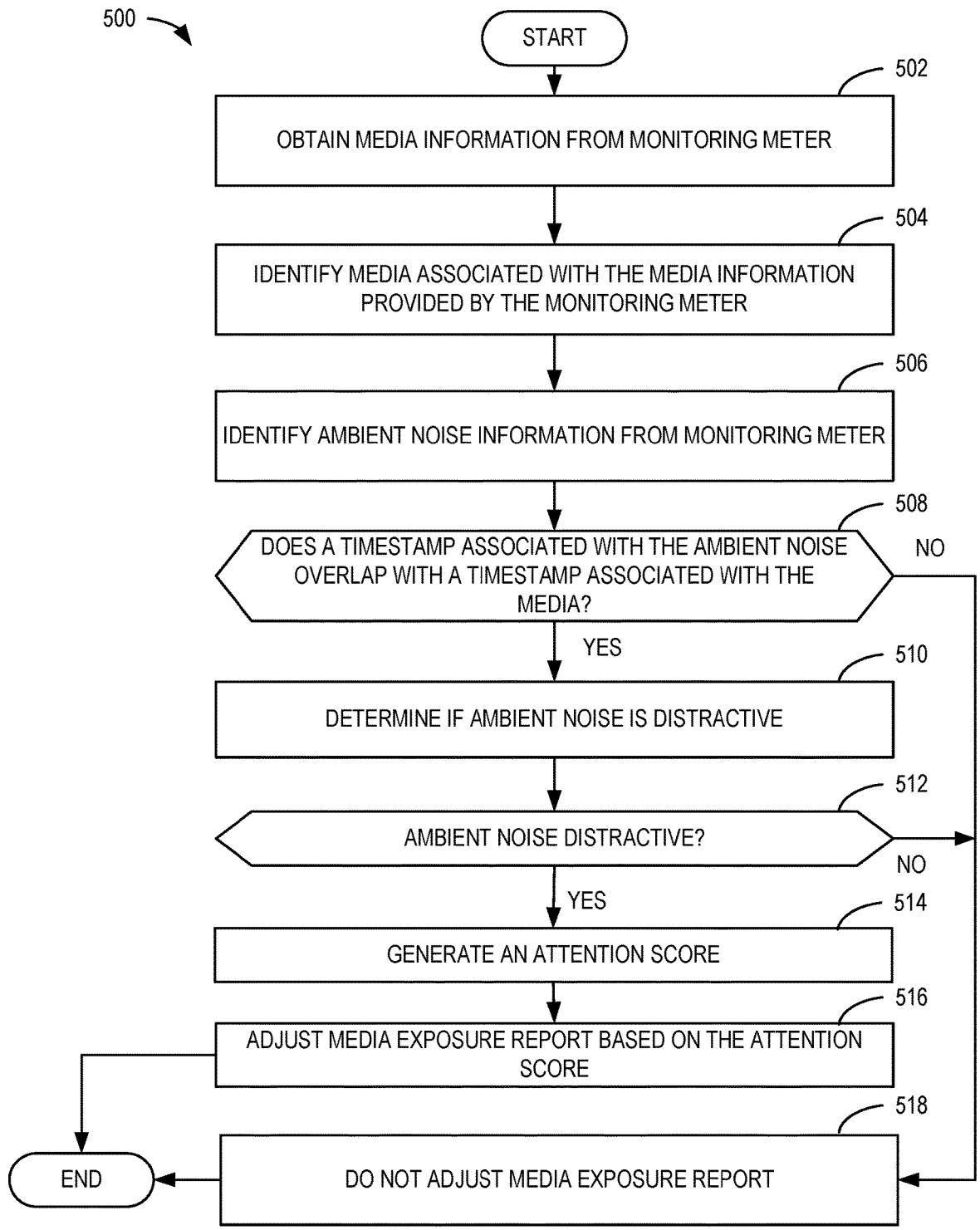
FIG. 5 is a flowchart representative of example machine readable instructions and/or example operations that may be executed by example processor circuitry to implement the example crediting adjusting system of FIGS. 1 and/or 3.

A flowchart representative of example hardware logic circuitry, machine readable instructions, hardware implemented state machines, and/or any combination thereof for implementing the meter 102 of FIG. 2 is shown in FIG. 4. A flowchart representative of example hardware logic circuitry, machine readable instructions, hardware implemented state machines, and/or any combination thereof for implementing the credit adjustment system 300 of FIG. 3 is shown in FIG. 5. The machine readable instructions may be one or more executable programs or portion(s) of an executable program for execution by processor circuitry, such as the processor circuitry 612 shown in the example processor platform 600 discussed below in connection with FIG. 6, the example processor circuitry 712 discussed below in connection with FIG. 7, and/or the processor circuitry discussed below in connection with FIGS. 8 and 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 4 and 5, many other methods of implementing the example meter 102 of the meter 102 and/or the credit adjustment system 300 of the crediting facility 114 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine(s). For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to monitor media and/or ambient noise (e.g., household clips) presented in a media presentation environment. The example operations 400 are executed by the example meter 102 of FIG. 2. The machine readable instructions and/or operations 400 of FIG. 4 begin at block 402, at which the monitoring determination circuitry 202 (FIG. 2) detects a metering event. For example, the monitoring determination circuitry 202 monitors a power state of the media device 110 (FIG. 1), an on/off indicator (e.g., a power on light/lamp, a power on tone/sound, etc.) of the media device 110, etc. If the monitoring determination circuitry 202 determines that the monitored power state, on/off indicator, etc., corresponds to the media device 110 being on, the monitoring determination circuitry 202 determines that a monitoring event is detected. If the monitoring determination circuitry 202 determines that the monitored power state, on/off indicator, etc., corresponds to the media device 110 being off, the monitoring determination circuitry 202 determines that a monitoring event is not detected. In some examples, the monitoring determining circuitry 202 detects a monitoring event if the meter 102 samples audio representative of media. For example, the monitoring determination circuitry 202 can sample audio from the media presentation environment 104 (FIG. 1) at predetermined time intervals (e.g., every 5 seconds, 10 seconds, etc.) and send the sample to the crediting facility 114 for determination of whether the sampled audio is representative of media or household clips. If the crediting facility 114 detects the sample audio as media, the crediting facility 114 communicates to the meter 102 that a monitoring event is detected. If the crediting facility 114 communicates that the sample audio is not media, a monitoring event is not detected. In some examples, the meter 102 processes the sample audio locally at the meter 102 using a general reference representative of a likelihood that detected audio is media or not media when determining whether a monitoring event is detected. For example, the monitoring determination circuitry 202 samples audio from the example media presentation environment 104 and sends the sample to the audio classification circuitry 204 (FIG. 2) to determine whether the sampled audio is representative of media.

In some examples, when the monitoring determination circuitry 202 determines that a metering event has been detected (e.g., block 402: YES), the audio classification circuitry 204 classifies the audio as corresponding to a media presentation by the media device 110 (block 404). For example, the audio classification circuitry 204 filters the audio presented by the media device 110 to distinguish between the media presented via the media device 110 and the noise generated in the media presentation environment 104. In some examples, the audio classification circuitry 204 employs a machine learning model to distinguish between ambient noise and audio signatures representative of media. Additionally or alternatively, the example audio classification circuitry 204 employs one or more filters, analog-to-digital converters, comparators, signal inputs, etc., to distinguish between ambient noise and audio signatures representative of media.

The example timestamp application circuitry 206 timestamps detected media (block 406). For example, the timestamp application circuitry 206 tags the detected audio with a time that the meter 102 obtained and/or detected the audio.

The example audio classification circuitry 204 determines if ambient noise is detected (block 408). For example, the audio classification circuitry 204 detects, during presentation of the media at the media device 110, ambient noise in the media presentation environment 104. The example audio classification circuitry 204 classifies (e.g., filters) audio generated in the media presentation environment 104 that is detected by the audio sensor 120 of the meter 102. The audio classification circuitry 204 separates (e.g., filters) the audio signals representative of the media being presented by the media device 110 in the media presentation environment 104 and the audio signals representative of audio clips or household noises generated in the media presentation environment during presentation of the media via the media device 110. In some examples, the audio classification circuitry 204 employs a machine learning model to classify the ambient noise in the media presentation environment 104. For example, the audio classification circuitry 204 analyzes the audio detected by the meter 102 and outputs an indication (e.g., a probability) as to whether ambient audio representative of household clips is detected.

In some examples, if the audio classification circuitry 204 detects ambient noise (e.g., block 408: YES), the timestamp application circuitry 206 timestamps the detected ambient noise (block 410). For example, the timestamp application circuitry 206 provides a timestamp to the captured audio associated with the detected household clips generated in the media presentation environment 104. In some examples, the timestamp application circuitry 206 tags the detected ambient noise with the timestamp. Additionally or alternatively, the timestamp application circuitry 206 instructs the metering detection datastore 210 to map the detected ambient noise to the timestamp.

The example information reporting circuitry 208 reports detected media and/or detected ambient noise to the example crediting facility 114 (FIG. 1) (block 412). For example, the information reporting circuitry 208 provides, forwards, sends, or otherwise communicates the media signals, the audio clip signals and the associated timestamps to the crediting facility 114.

In some examples, if the audio classification circuitry 204 does not detect ambient noise (e.g., block 408: NO), control turns to block 412, where the information reporting circuitry 208 reports the detected media to the example crediting facility 114.

The example operations 400 end when the example information reporting circuitry 208 sends and/or reports the detected media and/or detected ambient noise to the crediting facility 114. In some examples, the operations 400 are repeated each time the monitoring determination circuitry 202 detects a metering event.

FIG. 5 is a flowchart representative of example machine readable instructions and/or example operations 500 that may be executed and/or instantiated by processor circuitry to determine an attention score of an audience member of media when ambient noise is detected in a media presentation environment 104 (FIG. 1) during presentation of media. The example operations 500 are executed by the example credit adjustment system 300 of FIG. 3. The machine readable instructions and/or the operations 500 of FIG. 5 begin at block 502, at which the media identification circuitry 302 (FIG. 3) obtains media information from the meter 102. For example, the media identification circuitry 302 obtains media information from the example information reporting circuitry 208 (FIG. 2). In some examples, the media information includes, but is not limited to, time-stamped audio signals corresponding to media and time-stamped audio signals corresponding to ambient noise.

The example media identification circuitry 302 identifies media associated with the media information provided by the meter 102 (block 504). For example, the media identification circuitry 302 can employ signature matching techniques, watermark techniques, and/or any other media identification techniques to identify the media or advertisement presented by the media device 110.

The example reference/ML module 304 (FIG. 3) identifies the ambient noise information from the meter 102 (block 506). For example, the reference/ML module 304 queries a universal library, that includes predetermined reference audio identifiers (e.g., household clips) that typically occur in a household or in the media presentation environment 104 (FIG. 1), to classify (e.g., identify) the ambient noise. In some examples, such a query compares the monitored ambient noise to the reference audio identifiers to classify the ambient noise. For example, the reference/ML module 304 determines whether the monitored ambient noise matches at least one of the reference audio identifiers in the universal library.

Additionally or alternatively, the reference/ML module 304 employs a neural network to classify the ambient noise into a household activity. For example, the reference/ML module 304 employs a neural network that has been trained to identify an activity associated with the ambient noise detected by the meter 102.

The example reference/ML module 304 determines if a timestamp associated with the ambient noise overlaps a timestamp associated with the identified media (block 508). For example, the reference/ML module 304 uses a comparator to compare the timestamp of the ambient noise to the timestamp of the detected media.

In some examples, if the reference/ML module 304 determines that a timestamp associated with the ambient noise overlaps with the timestamp associated with the media (e.g., block 508: YES), the reference/ML module 304 determines if the ambient noise is distractive (block 510). For example, the reference/ML module 304 may employ an adaptive reference system that provides classifications of distractive ambient noise and non-distractive ambient noises. For example, the adaptive reference system may be a machine learning model that outputs an indication as to whether the ambient noise is distractive or non-distractive. Alternatively, the reference/ML module 304 compares the ambient noise to a library of reference signatures or signals representative of distractive noises.

The example attention scoring circuitry 306 determines whether the ambient noise was distractive (block 512).

In some examples, if the attention scoring circuitry 306 determines that the ambient noise is distractive (e.g., block 512: YES), then the attention scoring circuitry 306 generates an attention score (block 514). For example, the attention scoring circuitry 306 generates an attention measurement value representative of a single audience member's distractive state. In some examples, the attention score is a numerical value, where a low attention measurement value is representative of a completely distracted audience member and a high attention measurement value is representative of a completely engaged audience member. In some examples, a progressive scoring scale can be defined for the attention score.

The example report generating circuitry 308 adjusts a media exposure report based on the attention score (block 516). For example, the report generating circuitry 308 decreases a hit score of the audience measurement data in response to the ambient noise being distractive while media is presented.

In some examples, if the attention scoring circuitry 306 determines that the ambient noise is not distractive (e.g., block 512: NO), then the example report generating circuitry 308 does not adjust a media exposure report (block 518). For example, if the ambient noise is not distractive, then it is likely that the audience member is engaged and the media presented by the media device 110 can be credited.

The example operations 500 end when the example report generating circuitry 308 adjusts or does not adjust a media exposure report. The example operations 500 may be repeated when the example meter 102 provides media information to the example crediting facility 114.

Figure 6:
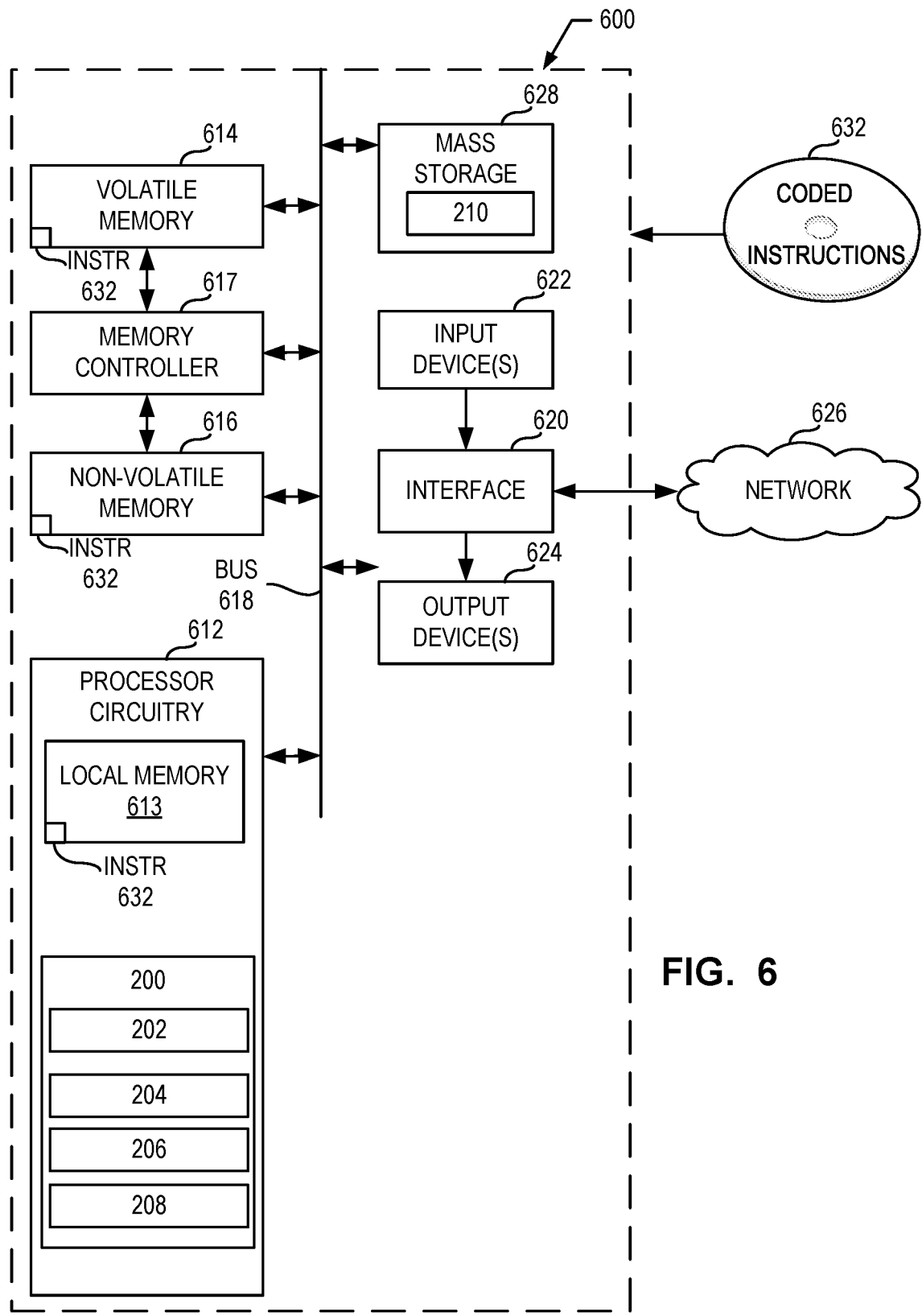
FIG. 6 is a block diagram of an example processing platform including processor circuitry structured to execute the example machine readable instructions and/or the example operations of FIG. 4 to implement the meter of FIGS. 1 and/or 2.

FIG. 6 is a block diagram of an example processor platform 600 structured to execute and/or instantiate the machine readable instructions and/or the operations of FIG. 4 to implement the meter 102 or meter 102 of FIGS. 1 and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the monitoring determination circuitry 202, the audio classification circuitry 204, the timestamp application circuitry 206, and the information reporting circuitry 208.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage devices 628 implements the metering detection datastore 210.

The machine executable instructions 632, which may be implemented by the machine readable instructions of FIG. 4, may be stored in the mass storage device 628, in the volatile memory 614, in the non-volatile memory 616, and/or on a removable non-transitory computer readable storage medium such as a CD or DVD.

Figure 7:
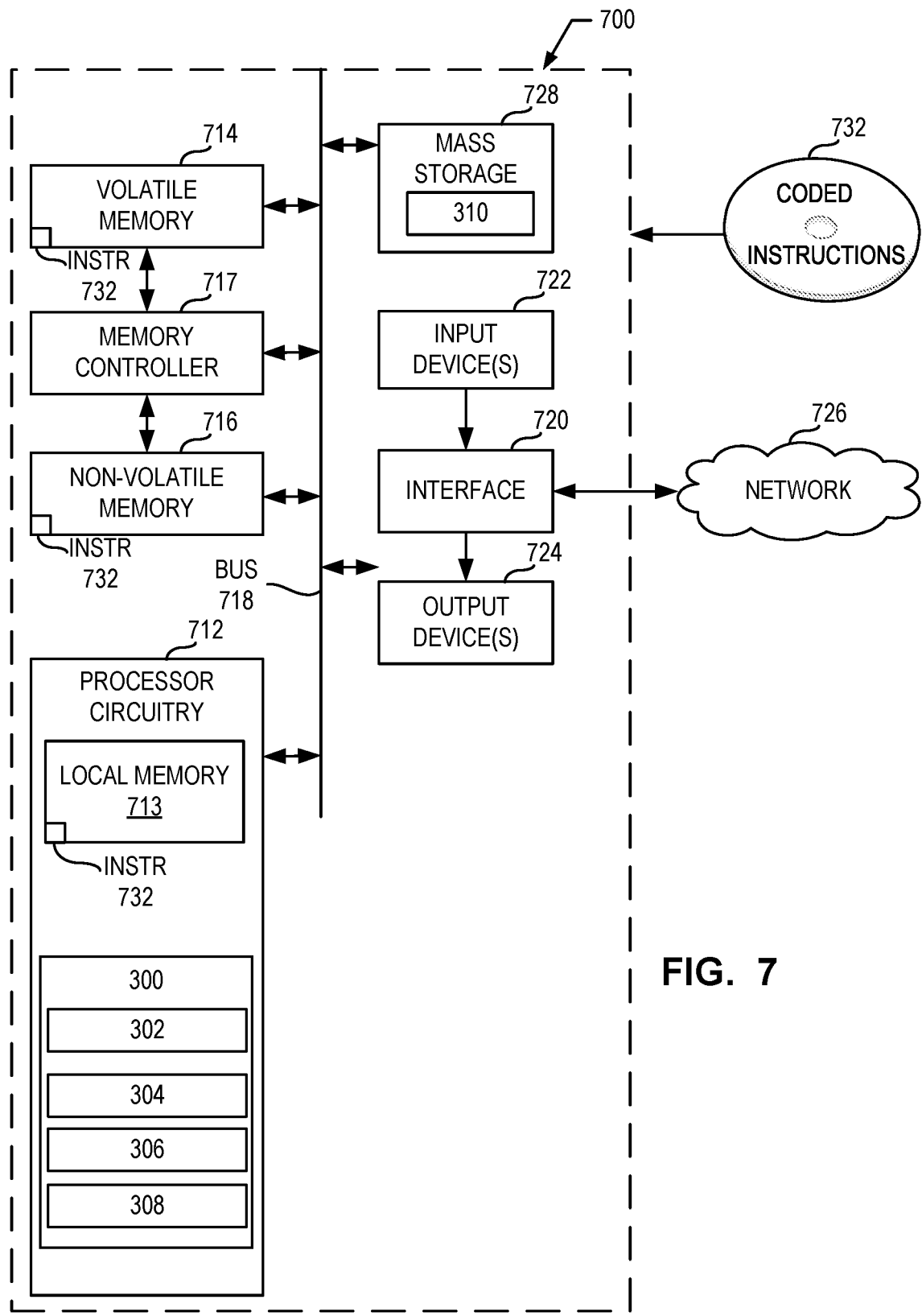
FIG. 7 is a block diagram of an example processing platform including processor circuitry structured to execute the example machine readable instructions and/or the example operations of FIG. 5 to implement the crediting adjusting system of FIGS. 1 and/or 3.

FIG. 7 is a block diagram of an example processor platform 700 structured to execute and/or instantiate the machine readable instructions and/or the operations of FIG. 5 to implement the credit adjustment system 300 or crediting facility 114 of FIGS. 1 and 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the media identification circuitry 302, the reference/ML module 304, the attention scoring circuitry 306, and the report generating circuitry 308.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 728 implement the example credit adjustment datastore 310.

The machine executable instructions 732, which may be implemented by the machine readable instructions of FIG. 5, may be stored in the mass storage device 728, in the volatile memory 714, in the non-volatile memory 716, and/or on a removable non-transitory computer readable storage medium such as a CD or DVD.

Figure 8:
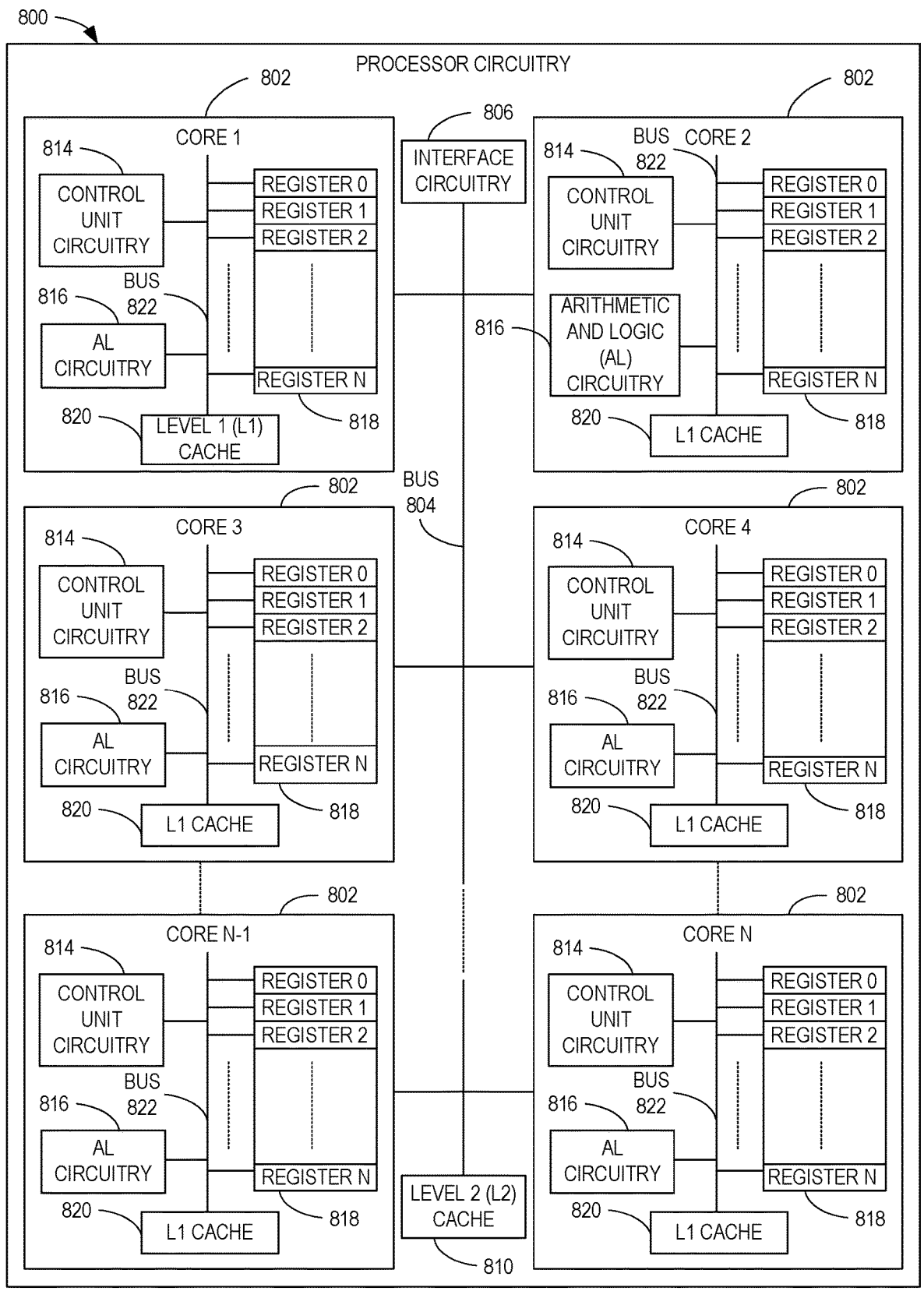
FIG. 8 is a block diagram of an example implementation of the processor circuitry of FIG. 6 or the processor circuitry of FIG. 7.

FIG. 8 is a block diagram of an example implementation of the processor circuitry 612 of FIG. 6 or the processor circuitry 712 of FIG. 7. In this example, the processor circuitry 612 of FIG. 6 or the processor circuitry 712 of FIG. 7 is implemented by a general purpose microprocessor 800. The general purpose microprocessor circuitry 800 executes some or all of the machine readable instructions of the flowchart of FIG. 4 to effectively instantiate the circuitry of FIG. 6 and/or FIG. 2 as logic circuits to perform the operations corresponding to those machine readable instructions. In some such examples, the circuitry of FIG. 2 [the meter 102] is instantiated by the hardware circuits of the microprocessor 800 in combination with the instructions. Alternatively, the general purpose microprocessor circuitry 800 executes some or all of the machine readable instructions of the flowchart of FIG. 5 to effectively instantiate the circuitry of FIG. 7 and/or FIG. 3 as logic circuits to perform the operations corresponding to those machine readable instructions. In some such examples, the circuitry of FIG. 3 [the credit adjustment system 300] is instantiated by the hardware circuits of the microprocessor 800 in combination with the instructions.

For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 4 and/or the flowchart of FIG. 5.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally, or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_ cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 614, 616, 714, 716 of FIGS. 6 and 7 respectively). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 6 or 7. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
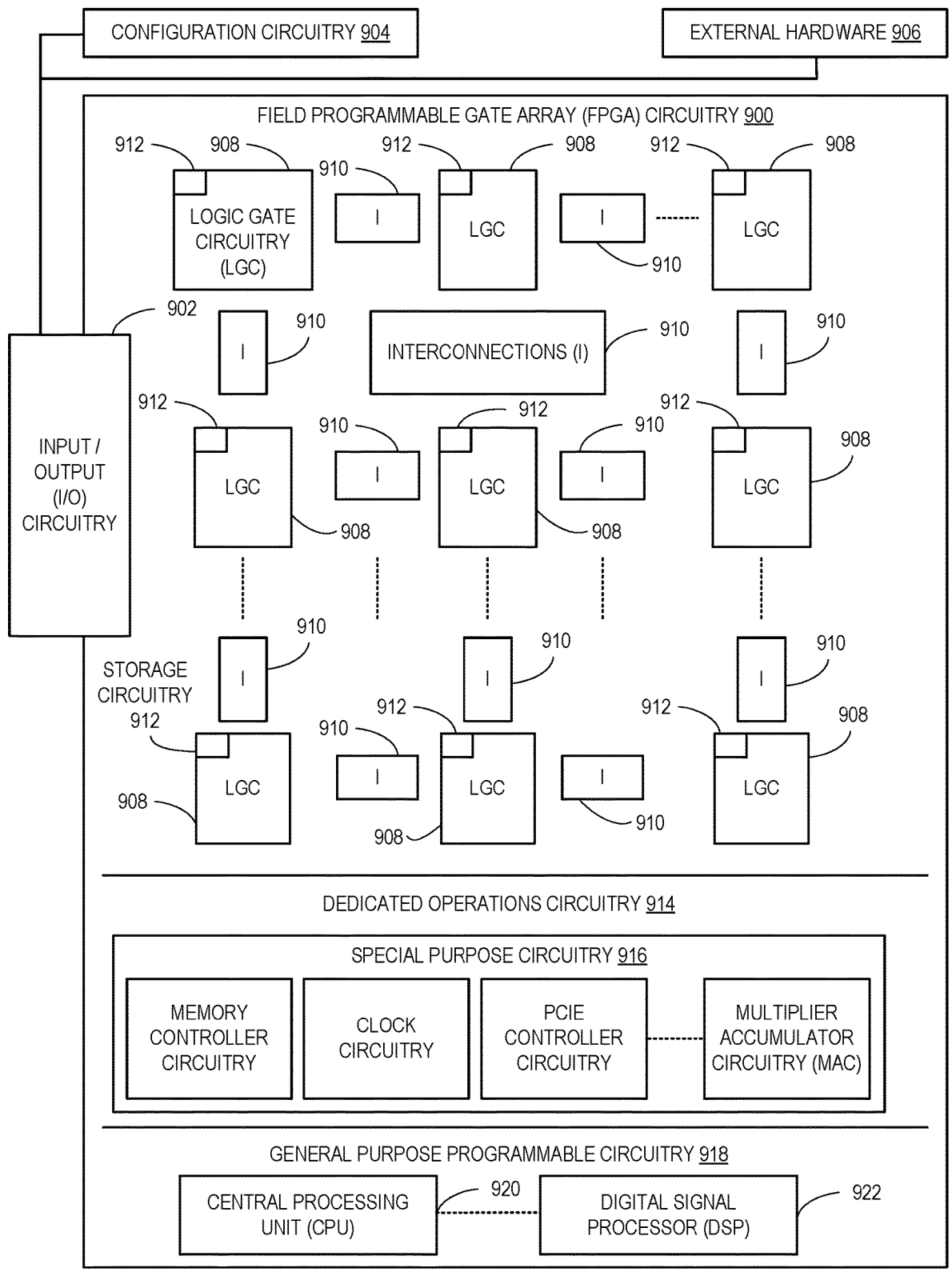
FIG. 9 is a block diagram of another example implementation of the processor circuitry of FIG. 6 or the processor circuitry of FIG. 7.

FIG. 9 is a block diagram of another example implementation of the processor circuitry 612 of FIG. 6 or the processor circuitry 712 of FIG. 7. In this example, the processor circuitry 612 of FIG. 6 or the processor circuitry 712 of FIG. 7 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4 and/or 5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIGS. 4 and/or 5. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIGS. 4 and/or 5. As such, the FPGA circuitry 900 may be structured to effectively instantiate some or all of the machine readable instructions of the flowchart of FIGS. 4 and/or 5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4 and/or 5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 4, 5, and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 612 of FIG. 6 and/or the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 612 of FIG. 6 and/or the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIG. 4 or 5 may be executed by one or more of the cores 802 of FIG. 8, a second portion of the machine readable instructions represented by the flowcharts of FIG. 4 or 5 may be executed by the FPGA circuitry 900 of FIG. 9, and/or a third portion of the machine readable instructions represented by the flowcharts of FIG. 4 or 5 may be executed by an ASIC. It should be understood that some or all of the circuitry of FIGS. 2 and/or 3 may, thus, be instantiated at the same or different times. Some or all of the circuitry may be instantiated, for example, in one or more threads executing concurrently and/or in series. Moreover, in some examples, some or all of the circuitry of FIGS. 2 and/or 3 may be implemented within one or more virtual machines and/or containers executing on the microprocessor.

In some examples, the processor circuitry 612 of FIG. 6 and/or the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 612 of FIG. 6 and/or the processor circuitry 712 of FIG. 7, which may be in one or more packages. For example, the XPU may include a CPU in one package, a DSP in another package, a GPU in yet another package, and an FPGA in still yet another package.

Figure 10:
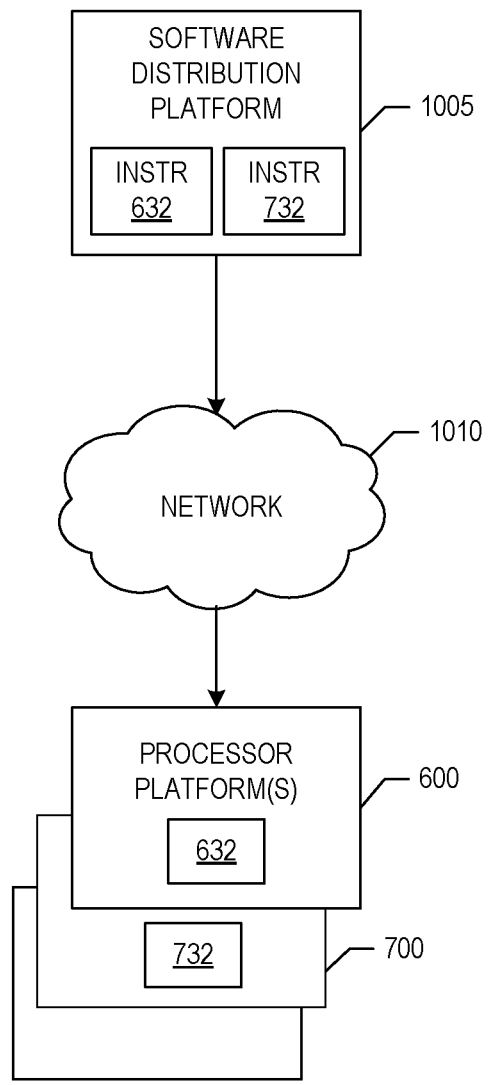
FIG. 10 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 632, 732 of FIGS. 6 and 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 632 of FIGS. 6 and 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 632, which may correspond to the example machine readable instructions 400 of FIG. 4, as described above or store the machine readable instructions 732, which may correspond to the example machine readable instructions 500 of FIG. 5, as described above. The one or more servers of the example software distribution platform 1005 are in communication with an example network 1010, which may correspond to any one or more of the Internet and/or any of the example network 118 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632, 732 from the software distribution platform 1005. For example, the software, which may correspond to the example machine readable instructions 400 of FIG. 4 and/or machine readable instructions 500 of FIG. 5, may be downloaded to the example processor platform 600 and processor platform 700, respectively, which are to execute the machine readable instructions 632 and 732, respectively, to implement the meter 102 and/or the credit adjustment system 300. In some examples, one or more servers of the software distribution platform 1005 periodically offer, transmit, and/or force updates to the software (e.g., the example machine readable instructions 632 of FIG. 6, the example machine readable instructions 732 of FIG. 7) to ensure improvements, patches, updates, etc., are distributed and applied to the software at the end user devices.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement system comprising:
   at least one processor; and
   memory having stored thereon machine readable instructions that, when executed by the at least one processor, cause the audience measurement system to:
   identify media presented via a media device in a media presentation environment, the presentation of the media associated with a first timestamp;
   identify an instance of distractive ambient audio detected in the media presentation environment, the detection of the instance of distractive ambient audio associated with a second timestamp;
   determine that the first timestamp aligns with the second timestamp;
   based on the determination that the first timestamp aligns with the second timestamp, generate an attention score indicating that the instance of distractive ambient audio is distractive to presentation of the media in the media presentation environment; and
   output a media exposure report based on the generated attention score.

2. The audience measurement system of claim 1, wherein the machine readable instructions further cause, when executed by the at least one processor, the audience measurement system to employ a neural network to classify a household activity associated with the identified instance of distractive ambient audio.

3. The audience measurement system of claim 1, wherein the machine readable instructions further cause, when executed by the at least one processor, the audience measurement system to identify the instance of distractive ambient audio by:
   employing a universal library including one or more reference audio identifiers corresponding to one or more known household activities; and
   comparing the instance of distractive ambient audio to the one or more reference audio identifiers.

4. The audience measurement system of claim 3, wherein the machine readable instructions further cause, when executed by the at least one processor, the audience measurement system to determine a household activity associated with the instance of distractive ambient audio based on comparing the instance of distractive ambient audio to the one or more reference audio identifiers.

5. The audience measurement system of claim 1, wherein the machine readable instructions further cause, when executed by the at least one processor, the audience measurement system to identify the instance of distractive ambient audio by:
   employing an adaptive reference system that is trained to classify ambient audio as either distractive or non-distractive based on a presence characteristic of previous and successive ambient audio detected in the media presentation environment; and
   determining that the instance of distractive ambient audio is distractive based on the presence characteristic.

6. The audience measurement system of claim 5, wherein the machine readable instructions further cause, when executed by the at least one processor, the audience measurement system to identify the instance of distractive ambient audio by comparing the presence characteristic to a threshold.

7. The audience measurement system of claim 1, wherein the machine readable instructions further cause, when executed by the at least one processor, the audience measurement system to decrease a hit score associated with the presentation of the media in response to generating the attention score indicating that the instance of distractive ambient audio is distractive.

8. A non-transitory machine readable storage medium comprising instructions that, when executed by a processor, cause performance of at least:
 identifying media presented via a media device in a media presentation environment, the presentation of the media associated with a first timestamp;
 identifying an instance of distractive ambient audio detected in the media presentation environment, the detection of the instance of distractive ambient audio associated with a second timestamp;
 determining that the first timestamp aligns with the second timestamp;
 based on the determination that the first timestamp aligns with the second timestamp, generate an attention score indicating that the instance of distractive ambient audio is distractive to presentation of the media in the media presentation environment; and
 outputting a media exposure report based on the generated attention score.

9. The non-transitory machine readable storage medium of claim 8, wherein the instructions further cause, when executed by the processor, performance of employing a neural network to classify a household activity associated with the identified instance of distractive ambient audio.

10. The non-transitory machine readable storage medium of claim 8, wherein the instructions further cause, when executed by the processor, performance of identifying the instance of distractive ambient audio by:
 employing a universal library including one or more reference audio identifiers corresponding to one or more known household activities; and
 comparing the instance of distractive ambient audio to the one or more reference audio identifiers.

11. The non-transitory machine readable storage medium of claim 10, wherein the instructions further cause, when executed by the processor, performance of determining a household activity associated with the instance of distractive ambient audio based on comparing the instance of distractive ambient audio to the one or more reference audio identifiers.

12. The non-transitory machine readable storage medium of claim 8, wherein the instructions further cause, when executed by the processor, performance of identifying the instance of distractive ambient audio by:
 employing an adaptive reference system that is trained to classify ambient audio as either distractive or non-distractive based on a presence characteristic of previous and successive ambient audio detected in the media presentation environment; and
 determining that the instance of distractive ambient audio is distractive based on the presence characteristic.

13. The non-transitory machine readable storage medium of claim 12, wherein the machine readable instructions further cause, when executed by the processor, performance of identifying the instance of distractive ambient audio by comparing the presence characteristic to a threshold.

14. The non-transitory machine readable storage medium of claim 8, wherein the instructions further cause, when executed by the processor, performance of decreasing a hit score associated with the presentation of the media in response to generating the attention score indicating that the instance of distractive ambient audio is distractive.

15. A method comprising:
 identifying, via one or more processors, media presented via a media device in a media presentation environment, the presentation of the media associated with a first timestamp;
 identifying, via one or more processors, an instance of distractive ambient audio detected in the media presentation environment, the detection of the instance of distractive ambient audio associated with a second timestamp;
 determining that the first timestamp aligns with the second timestamp;
 based on the determination that the first timestamp aligns with the second timestamp, generating, via one or more processors, an attention score indicating that the instance of distractive ambient audio is distractive to presentation of the media in the media presentation environment; and
 outputting a media exposure report based on the generated attention score.

16. The method of claim 15, wherein identifying the instance of distractive ambient audio includes:
 employing a universal library including one or more reference audio identifiers corresponding to one or more known household activities; and
 comparing the instance of distractive ambient audio to the one or more reference audio identifiers.

17. The method of claim 16, further including determining a household activity associated with the instance of distractive ambient audio based on comparing the instance of distractive ambient audio to the one or more reference audio identifiers.

18. The method of claim 15, wherein identifying the instance of distractive ambient audio includes:
 employing an adaptive reference system that is trained to classify ambient audio as either distractive or non-distractive based on a presence characteristic of previous and successive ambient audio detected in the media presentation environment; and
 determining that the instance of distractive ambient audio is distractive based on the presence characteristic.

19. The method of claim 18, wherein identifying the instance of distractive ambient audio further includes comparing the presence characteristic to a threshold.

20. The method of claim 15, further including decreasing a hit score associated with the presentation of the media in response to generating the attention score indicating that the instance of distractive ambient audio is distractive.

* * * * *